United States Patent
Edlund et al.

(10) Patent No.: US 6,596,057 B2
(45) Date of Patent: Jul. 22, 2003

(54) HYDROGEN-SELECTIVE METAL MEMBRANES, MEMBRANE MODULES, PURIFICATION ASSEMBLIES AND METHODS OF FORMING THE SAME

(75) Inventors: David J. Edlund, Bend, OR (US); William A. Pledger, Sisters, OR (US); R. Todd Studebaker, Bend, OR (US)

(73) Assignee: IdaTech, LLC, Bend, OR (US)

( * ) Notice: Subject to any disclaimer, the term of this patent is extended or adjusted under 35 U.S.C. 154(b) by 0 days.

(21) Appl. No.: 10/196,329

(22) Filed: Jul. 15, 2002

(65) Prior Publication Data

US 2003/0056652 A1 Mar. 27, 2003

Related U.S. Application Data

(63) Continuation-in-part of application No. 10/003,164, filed on Nov. 14, 2001, now Pat. No. 6,458,189, and a continuation of application No. 09/812,499, filed on Mar. 19, 2001, now Pat. No. 6,319,306, and a continuation-in-part of application No. 09/723,724, filed on Nov. 27, 2000, now Pat. No. 6,419,728, and a continuation-in-part of application No. 09/618,866, filed on Jul. 19, 2000, and a continuation-in-part of application No. 09/274,154, filed on Mar. 22, 1999, now Pat. No. 6,152,995.

(60) Provisional application No. 60/191,891, filed on Mar. 23, 2000.

(51) Int. Cl.[7] .............................. B01D 53/22
(52) U.S. Cl. .................. 96/4; 96/11; 422/211
(58) Field of Search ............... 95/45, 55, 56; 96/4.11; 210/321.75; 216/46, 53, 100, 108; 422/211

(56) References Cited

U.S. PATENT DOCUMENTS

| | | | |
|---|---|---|---|
| 2,824,620 A | 2/1958 | De Rosset | |
| 3,208,198 A | 9/1965 | Rubin | |
| 3,336,730 A | 8/1967 | McBride et al. | |
| 3,344,586 A | 10/1967 | Langley et al. | |
| 3,350,176 A | 10/1967 | Green et al. | |

(List continued on next page.)

FOREIGN PATENT DOCUMENTS

| | | |
|---|---|---|
| EP | 1065741 A2 | 1/2001 |
| JP | 45-14404 | 5/1970 |
| JP | 45-2642 | 9/1970 |
| JP | 1-145302 | 6/1989 |
| JP | 1-145303 | 6/1989 |

(List continued on next page.)

OTHER PUBLICATIONS

US 6,340,380, 1/2002, Frost et al. (withdrawn)
English abstract of Japanese Patent No. 1–262903, 1989.
English abstract of Japanese Patent No. 432150, 1992.
English abstract of Japanese Patent No. 513230, 1993.
English abstract of Japanese Patent No. 514790, 1993.
English abstract of Japanese Patent No. 604070, 1994.
English abstract of Japanese Patent No. 634540.

(List continued on next page.)

Primary Examiner—Robert H. Spitzer
(74) Attorney, Agent, or Firm—Kolisch Hartwell, P.C.

(57) ABSTRACT

Membrane modules that contain one or more hydrogen-selective membranes, methods for preparing the same, and hydrogen purification systems, fuel processors and devices containing the same. In some embodiments, the membrane modules include one or more hydrogen-selective membranes supported on a support or screen structure, of which a variety of embodiments are disclosed. In some embodiments, the membrane or membranes are adhesively mounted on the screen structure during assembly. In some embodiments, the screen structure includes a plurality of screen members adhesively mounted together during assembly. In some embodiments, the screen structure includes a coating. The present invention is also directed to methods for reducing the thickness of hydrogen-selective membranes.

49 Claims, 10 Drawing Sheets

U.S. PATENT DOCUMENTS

| | | |
|---|---|---|
| 3,356,538 A | 12/1967 | Miekka et al. |
| 3,368,329 A | 2/1968 | Eguchi et al. |
| 3,428,476 A | 2/1969 | Langley et al. |
| 3,439,474 A | 4/1969 | McKinley |
| 3,447,288 A | 6/1969 | Juda et al. |
| 3,450,500 A | 6/1969 | Setzer et al. |
| 3,469,372 A | 9/1969 | Yamauchi et al. |
| 3,469,944 A | 9/1969 | Bocard et al. |
| 3,486,301 A | 12/1969 | Bonnet |
| 3,520,803 A | 7/1970 | Iaconelli |
| 3,534,531 A | 10/1970 | Eguchi et al. |
| 3,564,819 A | 2/1971 | Neulander et al. |
| 3,665,680 A | 5/1972 | Heuser |
| 3,713,270 A | 1/1973 | Farr et al. |
| 3,761,382 A | 9/1973 | Hammond et al. |
| 3,839,110 A | 10/1974 | Shankoff |
| 3,849,076 A | 11/1974 | Gryaznov et al. |
| 3,881,891 A | 5/1975 | Goltsov et al. |
| 3,881,897 A | 5/1975 | Faure et al. |
| 3,972,695 A | 8/1976 | Buckley et al. |
| 4,003,725 A | 1/1977 | Bunn, Jr. et al. |
| 4,056,373 A | 11/1977 | Rubin |
| 4,078,985 A | 3/1978 | Takeuchi |
| 4,132,668 A | 1/1979 | Gryaznov et al. |
| 4,197,152 A | 4/1980 | Palty et al. |
| 4,238,403 A | 12/1980 | Pinto |
| 4,248,688 A | 2/1981 | Gartner et al. |
| 4,254,086 A | 3/1981 | Sanders |
| 4,313,013 A | 1/1982 | Harris |
| 4,319,923 A | 3/1982 | Falanga et al. |
| 4,329,157 A | 5/1982 | Dobo et al. |
| 4,331,520 A | 5/1982 | Juda et al. |
| 4,422,911 A | 12/1983 | Juda et al. |
| 4,468,235 A | 8/1984 | Hill |
| 4,472,176 A | 9/1984 | Rubin |
| 4,589,891 A | 5/1986 | Iniotakis et al. |
| 4,650,814 A | 3/1987 | Keller |
| 4,654,063 A | 3/1987 | Auvil et al. |
| 4,655,797 A | 4/1987 | Iniotakis et al. |
| 4,684,581 A | 8/1987 | Struthers |
| 4,713,234 A | 12/1987 | Weirich et al. |
| 4,810,485 A | 3/1989 | Marianowski et al. |
| 4,849,187 A | 7/1989 | Uozu et al. |
| 4,981,676 A | 1/1991 | Minet et al. |
| 4,999,107 A | 3/1991 | Guerif |
| 5,126,045 A | 6/1992 | Kohlheb et al. |
| 5,139,541 A | 8/1992 | Edlund |
| 5,158,581 A | 10/1992 | Coplan |
| 5,205,841 A | 4/1993 | Vaiman |
| 5,215,729 A | 6/1993 | Buxbaum |
| 5,217,506 A | 6/1993 | Edlund et al. |
| 5,225,080 A | 7/1993 | Karbachsch et al. |
| 5,229,102 A | 7/1993 | Minet et al. |
| 5,259,870 A | 11/1993 | Edlund |
| 5,326,550 A | 7/1994 | Adris et al. |
| 5,354,547 A | 10/1994 | Rao et al. |
| 5,376,167 A | 12/1994 | Broutin et al. |
| 5,393,325 A | 2/1995 | Edlund |
| 5,449,848 A | 9/1995 | Itoh |
| 5,498,278 A | 3/1996 | Edlund |
| 5,500,122 A | 3/1996 | Schwartz |
| 5,509,942 A | 4/1996 | Dodge |
| 5,518,530 A | 5/1996 | Sakai et al. |
| 5,520,807 A | 5/1996 | Myrna et al. |
| 5,525,322 A | 6/1996 | Willms |
| 5,536,405 A | 7/1996 | Myrna et al. |
| 5,612,012 A | 3/1997 | Soma et al. |
| 5,637,259 A | 6/1997 | Galuszka et al. |
| 5,639,431 A | 6/1997 | Shirasaki et al. |
| 5,645,626 A | 7/1997 | Edlund et al. |
| 5,658,681 A | 8/1997 | Sato et al. |
| 5,705,082 A | 1/1998 | Hinson |
| 5,705,916 A | 1/1998 | Rudbeck et al. |
| 5,734,092 A | 3/1998 | Wang et al. |
| 5,738,708 A | 4/1998 | Peachey et al. |
| 5,782,960 A | 7/1998 | Ogawa et al. |
| 5,814,112 A | 9/1998 | Elliott et al. |
| 5,821,185 A | 10/1998 | White et al. |
| 5,858,314 A | 1/1999 | Hsu et al. |
| 5,861,137 A | 1/1999 | Edlund |
| 5,888,273 A | 3/1999 | Buxbaum |
| 5,904,754 A | 5/1999 | Juda et al. |
| 5,931,987 A | 8/1999 | Buxbaum |
| 5,938,800 A | 8/1999 | Verrill et al. |
| 5,997,594 A | 12/1999 | Edlund et al. |
| 6,103,028 A | 8/2000 | Juda et al. |
| 6,152,995 A | 11/2000 | Edlund |
| 6,168,650 B1 | 1/2001 | Buxbaum |
| 6,171,574 B1 | 1/2001 | Juda et al. |
| 6,183,542 B1 * | 2/2001 | Bossard .................. 96/11 |
| 6,183,543 B1 | 2/2001 | Buxbaum |
| 6,221,117 B1 | 4/2001 | Edlund et al. |
| 6,238,465 B1 | 5/2001 | Juda et al. |
| 6,319,306 B1 | 11/2001 | Edlund et al. |
| 6,332,913 B1 | 12/2001 | Breitschwerdt et al. |
| 6,350,297 B1 * | 2/2002 | Doyle et al. ................ 95/55 |
| 6,395,405 B1 | 5/2002 | Buxbaum .............. 428/607 |
| 6,419,726 B1 | 7/2002 | Frost et al. .................. 95/56 |
| 6,419,728 B1 * | 7/2002 | Edlund ........................ 96/4 |
| 6,458,189 B1 * | 10/2002 | Edlund et al. ............... 96/7 |
| 6,461,408 B2 | 10/2002 | Buxbaum |
| 6,475,268 B2 * | 11/2002 | Thornton .................. 96/11 |
| 6,494,937 B1 * | 12/2002 | Edlund et al. ............... 96/4 |
| 2002/0124723 A1 * | 9/2002 | Frost et al. .................. 95/56 |
| 2002/0187089 A1 * | 12/2002 | Buxbaum ............... 422/211 |

FOREIGN PATENT DOCUMENTS

| | | |
|---|---|---|
| JP | 1-262903 | 10/1989 |
| JP | 6-134244 | 5/1994 |
| WO | WO 97/43796 | 11/1997 |
| WO | WO 99/30806 | 6/1999 |
| WO | WO 00/27507 | 5/2000 |
| WO | WO 01/03086 | 1/2001 |
| WO | WO 01/28662 | 4/2001 |

OTHER PUBLICATIONS

English abstract of Japanese Patent No. 710910, 1995.

English abstract of Japanese Patent No. 11116202, 1999.

Adris, A. M., et al., "A Fluidized Bed Membrane Reactor for the Steam Reforming of Methane," The Canadian Journal of Chemical Engineering, vol. 69, pp. 1061–1070 (Oct., 1991).

Amphlett, J. C., et al., "On Board Hydrogen Purification for Steam Reformer/PEM Fuel Cell Vehicle Power Plants," Energy Progress X, Proceedings of the $10^{th}$ World Hydrogen Energy Conference, Cocoa Beach, Florida, U.S.A., vol. 3, pp. 1681–1690 (Jun., 1994).

Amphlett, J. C., et al., "Simulation of a 250 kW Diesel Fuel Processor/PEM Fuel Cell System," Fifth Grove Fuel Cell Symposium, Commonwealth Institute, London, U.K., P. 8 (Sep. 22–25, 1997).

Chai, M., et al., "Promotion of Methane Steam Reforming Using Ruthenium–Dispersed Microporous Alumina Membrane Reactor," Chemistry Letters, The Chemical Society of Japan, pp. 41–44 (1993).

"Compact, Lightweight Fuel Reformer for Fuel Cells," Argonne National Laboratory/U.S. Department of Energy (Jul., 1996).

Edlund, Dr. David and William Pledger, "Development of a Compact and Economical Steam Reformer for Fuel–Cell Systems," Fifth Grove Fuel Cell Symposium, Commonwealth Institute, London, U.K., P. 6 (Sep. 22–23, 1997).

Edlund, David J. and William A. Pledger, "The Practical Use of Metal–Membrane Reactors for Industrial Applications," The 1995 Membrane Technology Reviews, pp. 89–97 (Nov., 1994).

Emonts, B., et al., "Compact Methanol Reformer Test for Fuel–Cell Powered Light–Duty Vehicles," Fifth Grove Fuel Cell Symposium, Commonwealth Institute, London, U.K., P. 42 (Sep. 22–25, 1997).

Emonts, B., et al., "Compact Methanol Reformer Test for Fuel–Cell Powered Light–Duty Vehicles," Fifth Grove Fuel Cell Symposium, Commonwealth Institute, London, U.K., (no page No.), (Sep. 22–25, 1997).

Jørgensen, S. Lægsgaard, et al., "Application of Pd–Membranes for the Production of Pure Hydrogen in Methanol–Based Fuel Cell Powered Vehicles," Proceedings of Fourth Workshop: Optimisation of Catalytic Membrane Reactor Systems, ESF Network, Catalytic Membrane Reactors, Oslo, Norway, pp. 51–57 (May 30–31, 1997).

Knapton, A. G., "Palladium Alloys for Hydrogen Diffusion Membranes," Platinum Metals Review, vol. 21, 44–50 (1977).

Ledjeff–Hey, K., et al., "Compact Hydrogen Production Systems for Solid Polymer Fuel Cells," Fifth Grove Fuel Cell Symposium, Commonwealth Institute, London, U.K., p. 17 (Sep. 22–25, 1997).

Menzer, R., et al., "Fuel Processing in Fuel Cell Systems for Mobile Applications—Gasoline as Energy Carrier On–Bord," Fifth Grove Fuel Cell Symposium, Commonwealth Institute, London, U.K., (no page no.), (Sep. 22–25, 1997).

Minet, R. G., et al., "Experimental Studies of A Ceramic Membrane Reactor for the Steam/Methane Reaction at Moderate Temperatures (400–700°C)," Symposium on Natural Gas Upgrading II Presented before The Division of Petroleum Chemistry, Inc., Meeting of American Chemical Society, San Francisco, California, U.S.A., pp. 245–248 (Apr., 1992).

Oertel, Michael, et al., "Steam Reforming of Natural Gas with Integrated Hydrogen Separation for Hydrogen Production," Chemical Engineering Techology, vol. 10, pp. 248–255 (1987).

Shu, J., et al., "Catalytic Palladium–Based Membrane Reactors: A Review," The Canadian Journal of Chemical Engineering, vol. 69, pp. 1036–1060 (Oct., 1991).

Teagan, W. P., et al., "Cost Reduction of Fuel Cells for Transportation Applications—Fuel Processing Options," Fifth Grove Fuel Cell Symposium, Commonwealth Institute, London, U.K. (Sep. 22–25, 1997).

* cited by examiner

> US 6,596,057 B2

HYDROGEN-SELECTIVE METAL MEMBRANES, MEMBRANE MODULES, PURIFICATION ASSEMBLIES AND METHODS OF FORMING THE SAME

RELATED APPLICATIONS

The present application is a continuation-in-part application claiming priority to U.S. patent application Ser. No. 09/723,724, which was filed on Nov. 27, 2000, issued on Jul. 16, 2002 as U.S. Pat. No. 6,419,728, and is a continuation-in-part of U.S. Pat. No. 6,152,995, which was filed on Mar. 22, 1999 as Ser. No. 09/274,154. This application is also a continuation-in-part application that claims priority to U.S. patent application Ser. No. 09/618,866, which was filed on Jul. 19, 2000, is also a continuation-in-part of U.S. Pat. No. 6,152,995. This application is also a continuation-in-part application that claims priority to U.S. patent application Ser. No. 10/003,164, which was filed on Nov. 14, 2001, issued on Oct. 1, 2002 as U.S. Pat. No. 6,458,189, and is a continuation of U.S. Pat. No. 6,319,306, which was filed on Mar. 19, 2001 as U.S. patent application Ser. No. 09/812,499 and which claims priority to U.S. Provisional Patent Application Ser. No. 60/191,891, which was filed on Mar. 23, 2000. The complete disclosures of the above-identified patent applications are hereby incorporated by reference for all purposes.

FIELD OF THE INVENTION

The invention relates generally to hydrogen-selective membranes and devices that form and/or purify hydrogen gas, and more particularly to methods for forming hydrogen-selective membranes, hydrogen-selective membrane modules, hydrogen purifiers and fuel processors.

BACKGROUND OF THE INVENTION

Purified hydrogen is used in the manufacture of many products including metals, edible fats and oils, and semiconductors and microelectronics. Purified hydrogen is also an important fuel source for many energy conversion devices, such as fuel-cell systems, and especially proton-exchange-membrane fuel-cell (PEMFC) systems.

Hydrogen gas streams may be produced by fuel processors that produce hydrogen gas by chemically reacting one or more feed streams. These fuel processors often require that the initial hydrogen stream be purified before the stream is suitable for use in a particular application, such as a feed stream to a fuel cell.

An example of a suitable fuel processor is a steam reformer, which produces hydrogen gas by reacting a hydrocarbon or alcohol with water. Other examples of suitable fuel processors produce hydrogen gas by autothermal reforming, partial oxidation of a hydrocarbon or alcohol vapor, by a combination of partial oxidation and steam reforming a hydrocarbon or an alcohol vapor, by pyrolysis of a hydrocarbon or alcohol vapor, and by electrolysis of water. Examples of suitable fuel processors and fuel cell systems incorporating the same are disclosed in U.S. Pat. Nos. 5,861,137, 5,997,594 and 6,376,113, the disclosures of which are hereby incorporated by reference.

Hydrogen-selective membranes formed from hydrogen-permeable metals, most notably palladium and alloys of palladium, are known. In particular, planar palladium-alloy membranes have been disclosed for purifying hydrogen gas streams, such as hydrogen gas streams produced by steam reformers, autothermal reformers, partial oxidation reactors, pyrolysis reactors and other fuel processors, including fuel processors configured to supply purified hydrogen to fuel cells or other processes requiring high-purity hydrogen.

To be economical, palladium and palladium-alloy membranes must be thin. For example, planar membranes are typically approximately 0.001 inches thick. However, forming an extremely thin membrane tends to become more expensive from a manufacturing standpoint as the thickness of the membrane is reduced. Furthermore, extremely thin membranes are subject to wrinkling during assembly into a membrane module containing one or more hydrogen-selective membranes. A membrane that has one or more wrinkles is subject to premature failure due to stress fractures forming at the wrinkle. When such a failure occurs, impurities that otherwise would be unable to pass through the membrane can now pass through the membrane, thereby reducing the purity of the product hydrogen stream and potentially damaging the fuel cell stack or other hydrogen-consuming device with which the purified stream is used.

SUMMARY OF THE INVENTION

The present invention is directed to membrane modules that contain one or more hydrogen-selective membranes, methods for preparing the same, and hydrogen purification systems, fuel processors and devices containing the same. In some embodiments, the membrane modules include one or more hydrogen-selective membranes supported on a support or screen structure, of which a variety of embodiments are disclosed. In some embodiments, the membrane or membranes are adhesively mounted on the screen structure during assembly. In some embodiments, the screen structure includes a plurality of screen members adhesively mounted together during assembly. In some embodiments, the screen structure includes a coating. The present invention is also directed to methods for reducing the thickness of hydrogen-selective membranes.

DETAILED DESCRIPTION AND BEST MODE OF THE INVENTION

Figure 1:
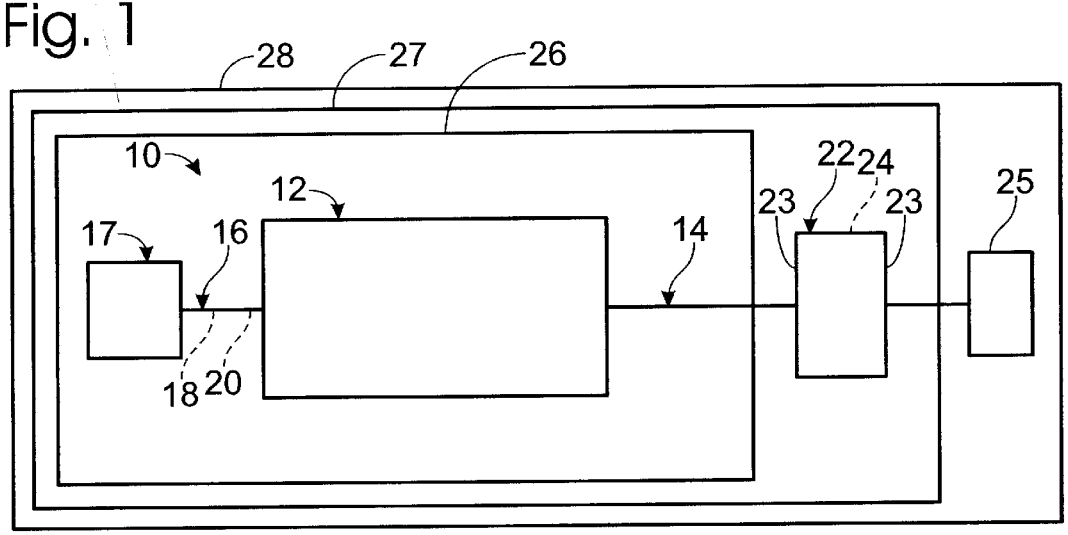
FIG. 1 is a schematic diagram of a fuel cell system containing a fuel processor with a membrane module according to the present invention.

A fuel cell system according to the present invention is shown in FIG. 1 and generally indicated at 10. System 10 includes at least one fuel processor 12 and at least one fuel cell stack 22. Fuel processor 12 is adapted to produce a product hydrogen stream 14 containing hydrogen gas from a feed stream 16 containing a feedstock. The fuel cell stack is adapted to produce an electric current from the portion of product hydrogen stream 14 delivered thereto. In the illustrated embodiment, a single fuel processor 12 and a single fuel cell stack 22 are shown and described, however, it should be understood that more than one of either or both of these components may be used. It should also be understood that these components have been schematically illustrated and that the fuel cell system may include additional components that are not specifically illustrated in the figures, such as feed pumps, air delivery systems, heat exchangers, heating assemblies and the like.

Fuel processor 12 produces hydrogen gas through any suitable mechanism. Examples of suitable mechanisms include steam reforming and autothermal reforming, in which reforming catalysts are used to produce hydrogen gas from a feed stream containing a carbon-containing feedstock and water. Other suitable mechanisms for producing hydrogen gas include pyrrolysis and catalytic partial oxidation of a carbon-containing feedstock, in which case the feed stream does not contain water. Still another suitable mechanism for producing hydrogen gas is electrolysis, in which case the feedstock is water. For purposes of illustration, the following discussion will describe fuel processor 12 as a steam reformer adapted to receive a feed stream 16 containing a carbon-containing feedstock 18 and water 20. However, it is within the scope of the invention that the fuel processor 12 may take other forms, as discussed above.

Examples of suitable carbon-containing feedstocks include at least one hydrocarbon or alcohol. Examples of suitable hydrocarbons include methane, propane, natural gas, diesel, kerosene, gasoline and the like. Examples of suitable alcohols include methanol, ethanol, and polyols, such as ethylene glycol and propylene glycol.

Feed stream 16 may be delivered to fuel processor 12 via any suitable mechanism. Although only a single feed stream 16 is shown in FIG. 1, it should be understood that more than one stream 16 may be used and that these streams may contain the same or different components. When carbon-containing feedstock 18 is miscible with water, the feedstock is typically delivered with the water component of feed stream 16, such as shown in FIG. 1. When the carbon-containing feedstock is immiscible or only slightly miscible with water, these components are typically delivered to fuel processor 12 in separate streams, such as shown in FIG. 2.

Figure 2:
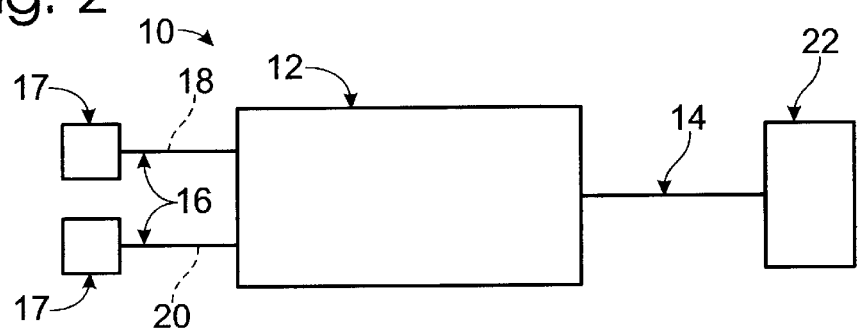
FIG. 2 is a schematic diagram of another embodiment of the fuel cell system of FIG. 1.

In FIGS. 1 and 2, feed stream 16 is shown being delivered to fuel processor 12 by a feed stream delivery system 17. Delivery system 17 includes any suitable mechanism, device, or combination thereof that delivers the feed stream to fuel processor 12. For example, the delivery system may include one or more pumps that deliver the components of stream 16 from a supply. Additionally, or alternatively, system 17 may include a valve assembly adapted to regulate the flow of the components from a pressurized supply. The supplies may be located external of the fuel cell system, or may be contained within or adjacent the system.

Fuel cell stack 22 contains at least one, and typically multiple, fuel cells 24 adapted to produce an electric current from the portion of the product hydrogen stream 14 delivered thereto. This electric current may be used to satisfy the energy demands, or applied load, of an associated energy-consuming device 25. Illustrative examples of devices 25 include, but should not be limited to, a motor vehicle, recreational vehicle, boat, tool, light or lighting assemblies, appliances (such as household or other appliances), household, signaling or communication equipment, etc. It should be understood that device 25 is schematically illustrated in FIG. 1 and is meant to represent one or more devices or collection of devices that are adapted to draw electric current from the fuel cell system. A fuel cell stack typically includes multiple fuel cells joined together between common end plates 23, which contain fluid delivery/removal conduits (not shown). Examples of suitable fuel cells include proton exchange membrane (PEM) fuel cells and alkaline fuel cells. Fuel cell stack 22 may receive all of product hydrogen stream 14. Some or all of stream 14 may additionally, or alternatively, be delivered, via a suitable conduit, for use in another hydrogen-consuming process, burned for fuel or heat, or stored for later use.

Fuel processor 12 is any suitable device that produces hydrogen gas. Preferably, the fuel processor is adapted to produce substantially pure hydrogen gas, and even more preferably, the fuel processor is adapted to produce pure hydrogen gas. For the purposes of the present invention, substantially pure hydrogen gas is greater than 90% pure, preferably greater than 95% pure, more preferably greater than 99% pure, and even more preferably greater than 99.5% pure. Suitable fuel processors are disclosed in U.S. Pat. Nos. 5,997,594 and 5,861,137, pending U.S. patent application Ser. No. 09/291,447, which was filed on Apr. 13, 1999, and is entitled "Fuel Processing System," and U.S. patent application Ser. No. 09/802,361, which was filed on Mar. 8, 2000 and is entitled "Fuel Processor and Systems and Devices Containing the Same," each of which is incorporated by reference in its entirety for all purposes.

Figure 3:
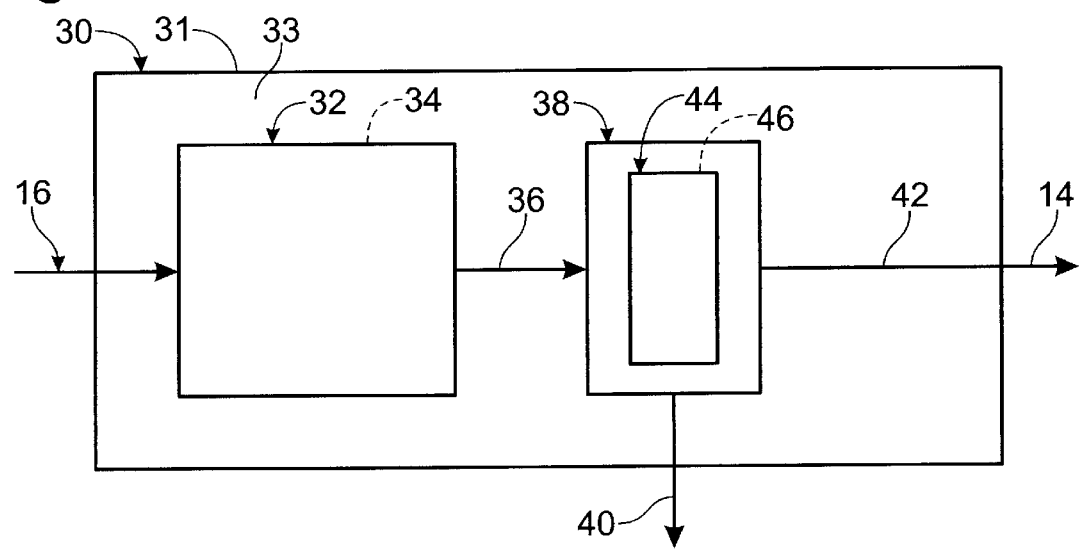
FIG. 3 is a schematic diagram of a fuel processor suitable for use in the fuel cell systems of FIGS. 1 and 2 and including a membrane module according to the present invention.

An example of a suitable fuel processor 12 is a steam reformer. An example of a suitable steam reformer is shown in FIG. 3 and indicated generally at 30. Reformer 30 includes a reforming, or hydrogen-producing, region 32 that includes a steam reforming catalyst 34. Alternatively, reformer 30 may be an autothermal reformer that includes an autothermal reforming catalyst. In reforming region 32, a reformate stream 36 is produced from the water and carbon-containing feedstock forming feed stream 16. The reformate stream typically contains hydrogen gas and impurities, and therefore is delivered to a separation region, or purification region, 38, where the hydrogen gas is purified. In separation region 38, the hydrogen-containing stream is separated into one or more byproduct streams, which are collectively illustrated at 40, and a hydrogen-rich stream 42 by any suitable pressure-driven separation process. In FIG. 3, hydrogen-rich stream 42 is shown forming product hydrogen stream 14. Separation region 38 includes a membrane module 44 according to the present invention and contains one or more hydrogen-selective membranes 46. Membrane module 44 is discussed and illustrated in more detail subsequently.

Figure 4:
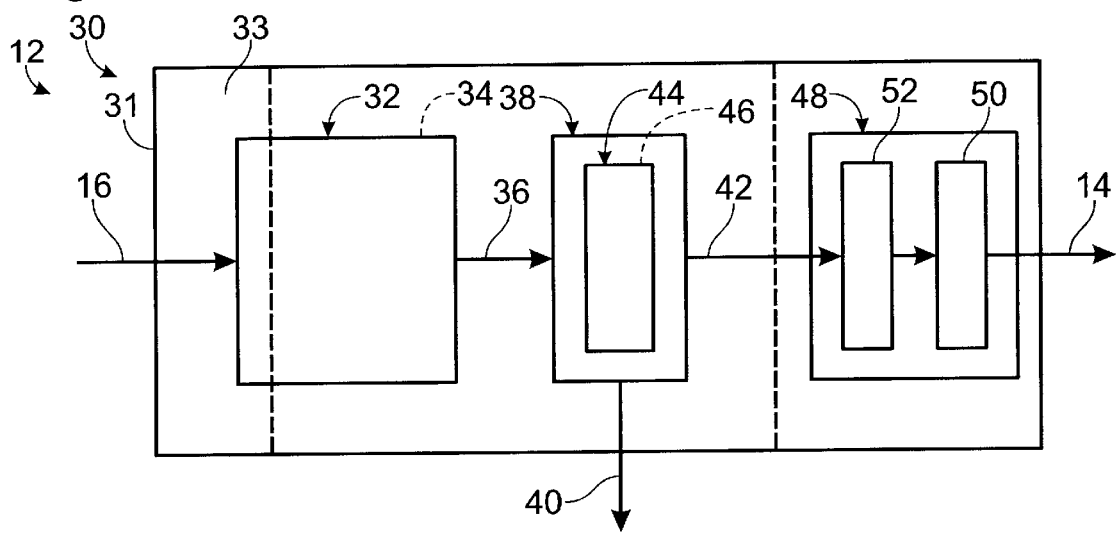
FIG. 4 is a schematic diagram of another embodiment of the fuel processor of FIG. 3.

Reformer 30 may, but does not necessarily, further include a polishing region 48, such as shown in FIG. 4. Polishing region 48 receives hydrogen-rich stream 42 from separation region 38 and further purifies the stream by reducing the concentration of, or removing, selected compositions therein. For example, when stream 42 is intended for use in a fuel cell stack, such as stack 22, compositions that may damage the fuel cell stack, such as carbon monoxide and carbon dioxide, may be removed from the hydrogen-rich stream. The concentration of carbon monoxide should be less than 10 ppm (parts per million) to prevent the control system from isolating the fuel cell stack. Preferably, the system limits the concentration of carbon monoxide to less than 5 ppm, and even more preferably, to less than 1 ppm. The concentration of carbon dioxide may be greater than that of carbon monoxide. For example, concentrations of less than 25% carbon dioxide may be acceptable. Preferably, the concentration is less than 10%, even more preferably, less than 1%. Especially preferred concentrations are less than 50 ppm. It should be understood that the acceptable minimum concentrations presented herein are illustrative examples, and that concentrations other than those presented herein may be used and are within the scope of the present invention. For example, particular users or manufacturers may require minimum or maximum concentration levels or ranges that are different than those identified herein.

Region 48 includes any suitable structure for removing or reducing the concentration of the selected compositions in stream 42. For example, when the product stream is intended for use in a PEM fuel cell stack or other device that will be damaged if the stream contains more than determined concentrations of carbon monoxide or carbon dioxide, it may be desirable to include at least one methanation catalyst bed 50. Bed 50 converts carbon monoxide and carbon dioxide into methane and water, both of which will not damage a PEM fuel cell stack. Polishing region 48 may also include another hydrogen-producing device 52, such as another reforming catalyst bed, to convert any unreacted feedstock into hydrogen gas. In such an embodiment, it is preferable that the second reforming catalyst bed is upstream from the methanation catalyst bed so as not to reintroduce carbon dioxide or carbon monoxide downstream of the methanation catalyst bed.

Steam reformers typically operate at temperatures in the range of 200° C. and 700° C., and at pressures in the range of 50 psi and 1000 psi, although temperatures outside of this range are within the scope of the invention, such as depending upon the particular type and configuration of fuel processor being used. Any suitable heating mechanism or device may be used to provide this heat, such as a heater, burner, combustion catalyst, or the like. The heating assembly may be external the fuel processor or may form a combustion chamber that forms part of the fuel processor. The fuel for the heating assembly may be provided by the fuel processing system, or fuel cell system, by an external source, or both.

In FIGS. 3 and 4, reformer 30 is shown including a shell 31 in which the above-described components are contained. Shell 31, which also may be referred to as a housing, enables the fuel processor, such as reformer 30, to be moved as a unit. It also protects the components of the fuel processor from damage by providing a protective enclosure and reduces the heating demand of the fuel processor because the components of the fuel processor may be heated as a unit. Shell 31 may, but does not necessarily, include insulating material 33, such as a solid insulating material, blanket insulating material, or an air-filled cavity. It is within the scope of the invention, however, that the reformer may be formed without a housing or shell. When reformer 30 includes insulating material 33, the insulating material may be internal the shell, external the shell, or both. When the insulating material is external a shell containing the above-described reforming, separation and/or polishing regions, the fuel processor may further include an outer cover or jacket external the insulation.

It is further within the scope of the invention that one or more of the components may either extend beyond the shell or be located external at least shell 31. For example, and as schematically illustrated in FIG. 4, polishing region 48 may be external shell 31 and/or a portion of reforming region 32 may extend beyond the shell.

Although fuel processor 12, feed stream delivery system 17, fuel cell stack 22 and energy-consuming device 25 may all be formed from one or more discrete components, it is also within the scope of the invention that two or more of these devices may be integrated, combined or otherwise assembled within an external housing or body. For example, a fuel processor and feed stream delivery system may be combined to provide a hydrogen-producing device with an on-board, or integrated, feed stream delivery system, such as schematically illustrated at 26 in FIG. 1. Similarly, a fuel cell stack may be added to provide an energy-generating device with an integrated feed stream delivery system, such as schematically illustrated at 27 in FIG. 1.

Fuel cell system 10 may additionally be combined with an energy-consuming device, such as device 25, to provide the device with an integrated, or on-board, energy source. For example, the body of such a device is schematically illustrated in FIG. 1 at 28. Examples of such devices include a rotor vehicle, such is as a recreational vehicle, automobile, boat or other seacraft, and the like, a dwelling, such as a house, apartment, duplex, apartment complex, office, store or the like, or a self-contained equipment, such as an appliance, light, tool, microwave relay station, transmitting assembly, remote signaling or communication equipment, etc.

It is within the scope of the invention that the above-described fuel processor 12 may be used independent of a fuel cell stack. In such an embodiment, the system may be referred to as a fuel processing system, and it may be used to provide a supply of pure or substantially pure hydrogen to a hydrogen-consuming device, such as a burner for heating, cooking or other applications. Similar to the above discussion about integrating the fuel cell system with an energy-consuming device, the fuel processor and hydrogen-consuming device may be combined, or integrated.

Figure 5:
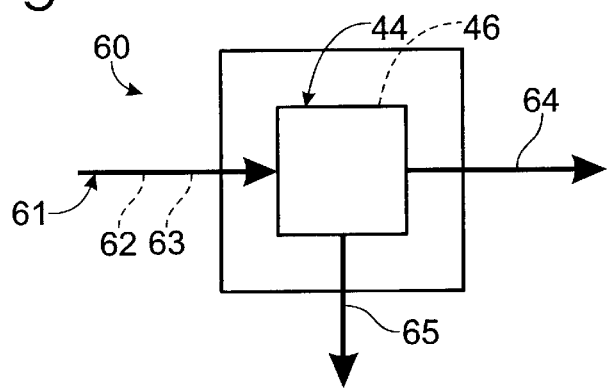
FIG. 5 is a schematic diagram of a hydrogen purifier containing a membrane module according to the present invention.

It is also within the scope of the present invention that the membrane modules disclosed herein may be used as a hydrogen purifier independent of a fuel processor or fuel cell stack. An example of a membrane module 44 configured for use as a hydrogen-purifier is schematically illustrated in FIG. 5 and generally indicated at 60. As shown, a mixed gas stream 61 containing hydrogen gas 62 and other gases 63 is delivered to purifier 60, which contains a membrane module 44 constructed according to the present invention. The membrane module contains at least one hydrogen-selective membrane 46, and separates the mixed gas stream into a product stream 64 containing at least substantially hydrogen gas and a byproduct stream 65 containing at least substantially the other gases. Another way to describe the purifier is that the product stream contains at least a substantial portion of the hydrogen gas in the mixed gas stream and that the byproduct stream contains at least a substantial portion of the other gases. Similar to the fuel processors and fuel cell systems discussed above, purifier 60 may be integrated with a hydrogen-producing device to provide a hydrogen-producing device with an integrated hydrogen purifier and/or with a hydrogen-consuming device to provide a hydrogen-consuming device with an integrated hydrogen purifier.

It should be understood that the hydrogen purity of the product stream, the hydrogen content of the byproduct stream, the percentage of hydrogen from the mixed gas stream that forms the byproduct stream, and similar coin positions of the product and byproduct streams may be selectively varied depending upon the construction of the membrane module and/or the operating conditions within which the membrane module is used. For example, the compositions of the product and byproduct streams may vary at least partially in response to at least the following factors: the temperature of the membrane module, the pressure of the membrane module, the composition of the hydrogen-selective membrane, the state of wear of the hydrogen-selective membrane, the thickness of the hydrogen-selective membrane, the composition of the mixed gas stream, the number of hydrogen-selective membranes used in the membrane module, and the number of sequential membranes through which the mixed gas, product and/or byproduct streams may pass.

As discussed, a suitable structure for use in separation region 38 is a membrane module 44, which contains one or more hydrogen-permeable and hydrogen-selective membranes 46. The membranes may be formed of any hydrogen-selective material suitable for use in the operating environment and conditions in which the membrane module is operated, such as in a purifier, fuel processor or the like. Examples of suitable materials for membranes 46 are palladium and palladium alloys, and especially thin films of such metals and metal alloys. Palladium alloys have proven particularly effective, especially palladium with 35 wt % to 45 wt % copper, such as palladium with approximately 40 wt % copper. These membranes are typically formed from a thin foil that is approximately 0.001 inches thick. It is within the scope of the present invention, however, that the membranes may be formed from hydrogen-selective metals and metal alloys other than those discussed above and that the membranes may have thicknesses that are larger or smaller than discussed above. For example, the membrane may be made thinner, with commensurate increase in hydrogen flux. Suitable mechanisms for reducing the thickness of the membrane include rolling, sputtering and etching. A suitable etching process is disclosed in U.S. Pat. No. 6,152,995, the complete disclosure of which is hereby incorporated by reference.

Figure 6:
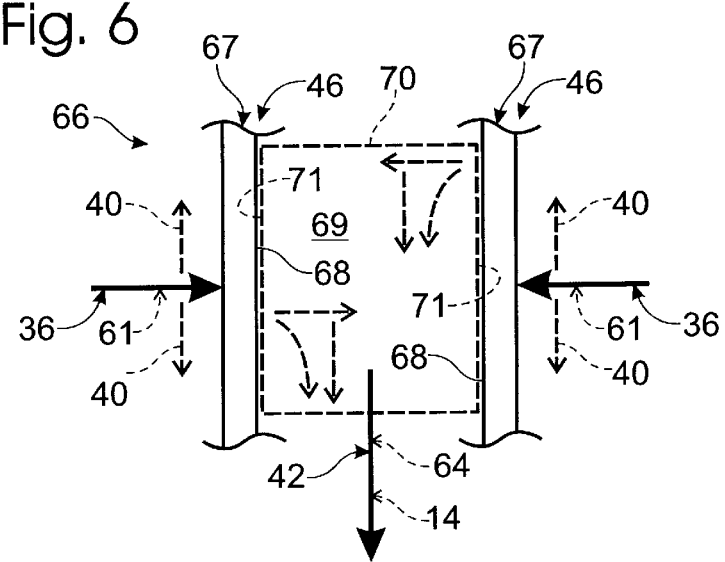
FIG. 6 is a fragmentary side elevation view of a membrane envelope constructed according to the present invention and including a screen structure.

The hydrogen-permeable membranes may be arranged in pairs around a common permeate channel to form a membrane envelope, as is disclosed in the incorporated patent applications and as schematically illustrated in FIG. 6 at 66. In such a configuration, the membrane pairs may be referred to as a membrane envelope, in that they define a common permeate channel, or harvesting conduit, through which the permeated gas may be collected and removed to form hydrogen-rich stream 42 (or product hydrogen stream 14 or purified hydrogen stream 64, depending on the particular implementation of the membrane module).

It should be understood that the membrane pairs may take a variety of suitable shapes, such as planar envelopes and tubular envelopes. Similarly, the membranes may be independently supported, such as with respect to an end plate or around a central passage. For purposes of illustration, the following description and associated illustrations will describe the membrane module as including one or more membrane envelopes 66. It should be understood that the membranes forming the envelope may be two separate membranes, or may be a single membrane folded, rolled or otherwise configured to define two membrane regions, or surfaces, 67 with permeate faces 68 that are oriented toward each other to define a conduit 69 therebetween from which the permeate gas may be collected and withdrawn.

To support the membranes against high feed pressures, a support, or screen structure, 70 is used. Screen structure 70 provides support to the hydrogen-selective membranes, and more particularly includes surfaces 71 that against which the permeate sides 68 of the membranes are supported. Screen structure 70 also defines harvesting conduit 69, through which permeated gas may flow both transverse and parallel to the surface of the membrane through which the gas passes, such as schematically illustrated in FIG. 6. The permeate gas, which is at least substantially pure hydrogen gas, may then be harvested or otherwise withdrawn from the membrane module, such as to form streams 42, 64, and/or 14. Because the membranes lie against the screen structure, it is preferable that the screen structure does not obstruct the flow of gas through the hydrogen-selective membrane. The gas that does not pass through the membranes forms one or more byproduct streams, as schematically illustrated in FIG. 6.

To reiterate, the membrane module discussed herein may include one or more membrane envelopes 66, typically along with suitable input and output ports through which the mixed gas stream, such as reformate stream 36 or mixed gas stream 61, is delivered to the membrane module and from which the hydrogen-rich and byproduct streams are removed. In some embodiments, the membrane module may include a plurality of membrane envelopes. When the membrane module includes a plurality of membrane envelopes, the module may include fluid conduits interconnecting the envelopes, such as to deliver a mixed gas stream thereto, to withdraw purified hydrogen gas therefrom, and/or to withdraw the gas that does not pass through the membranes from the membrane module. When the membrane module includes a plurality of membrane envelopes, the permeate stream, byproduct stream, or both, from a first membrane envelope may be sent to another membrane envelope for further purification.

Figure 7:
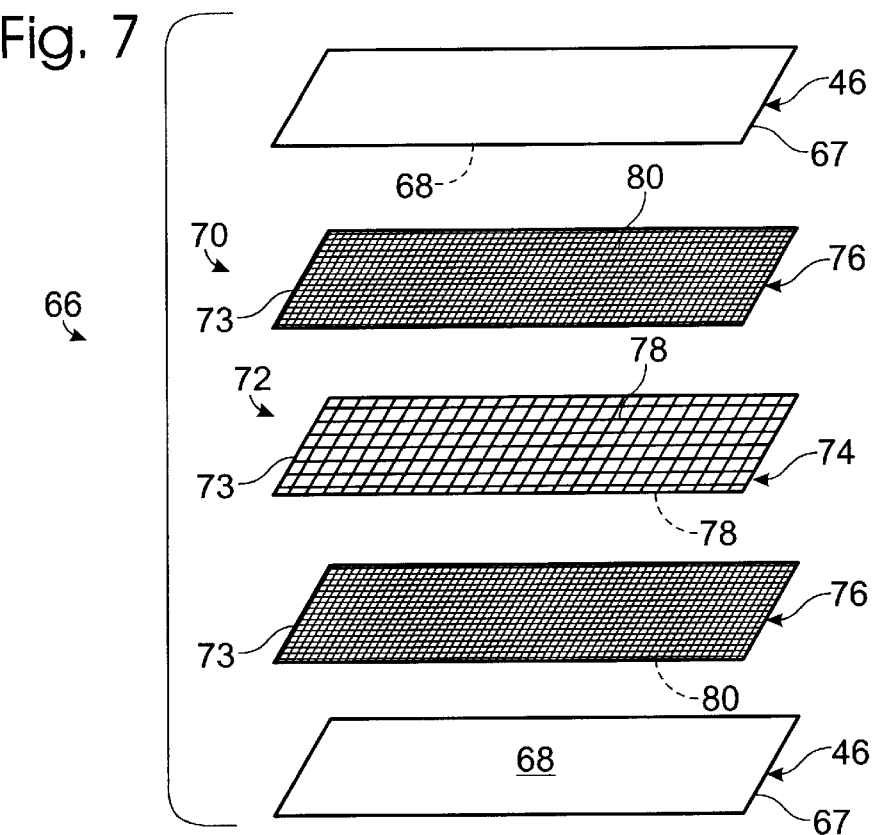
FIG. 7 is an exploded isometric view of another embodiment of a membrane envelope constructed according to the present invention and including a screen structure having several layers.
Figure 8:
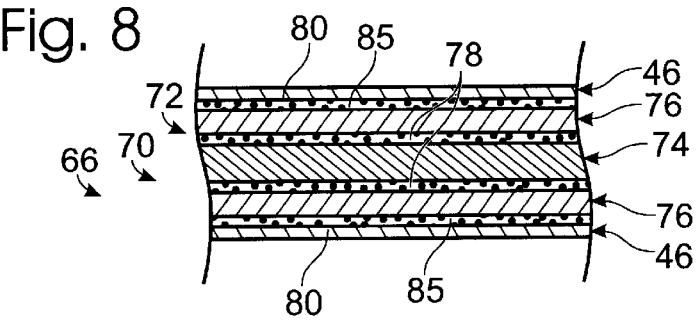
FIG. 8 is a cross-sectional view of the membrane envelope of FIG. 7.

An embodiment of a suitable screen structure 70 is shown in FIGS. 7 and 8 and generally indicated at 72. Screen structure 72 includes plural screen members 73. In the illustrated embodiment, the screen members include a coarse mesh screen 74 sandwiched between fine mesh screens 76. It should be understood that the terms "fine" and "coarse" are relative terms. Preferably, the outer screen members are selected to support membranes 46 without piercing the membranes and without having sufficient apertures, edges or other projections that may pierce, weaken or otherwise damage the membrane under the operation conditions with which the membrane module is used. Because the screen structure needs to provide for flow of the permeated gas generally parallel to the membranes, it is preferable to use a relatively coarser inner screen member to provide for enhanced parallel flow conduits. In other words, the finer mesh screens provide better protection for the membranes, while the coarser mesh screen provides better flow generally parallel to the membranes.

According to the method of the present invention, an adhesive, such as a contact adhesive, is used to secure membranes 46 to the screen structure during fabrication. An example of a suitable adhesive is sold by 3M under the trade name SUPER 77. An adhesive may additionally or alternatively be used to adhere the fine mesh screens to coarse mesh screen 74 during assembly. In FIG. 7, reference numerals 78 and 80 are used to indicate respectively adhesive joining membrane 46 with screen structure 70 and individual screen members 73. It should be understood that adhesives 78 and 80 may have the same or different compositions, thicknesses and/or application methods.

The use of adhesive 78 allows the sandwiched screen structure to be retained as a unit in a selected configuration, such as the flat, planar configuration shown in FIGS. 7 and 8. The use of adhesive 80 allows the thin membranes to be firmly attached to the screen structure without any wrinkles in the membrane. It is important that these components be held flat and in close contact during assembly of the membrane module. If the membrane buckles, or if the screen structure buckles, then a wrinkle will form in the membrane during use. Similarly, if the membranes are improperly positioned relative to the screen structure, wrinkles may also occur, such as when the membrane module is pressurized. As pointed out above, wrinkles in the membrane lead to stress fractures and fatigue fractures, causing failure of the membrane module and contamination of the purified gas stream.

In practice, a light coating of contact adhesive 78 is sprayed or otherwise applied to the two opposing major surfaces of the coarse mesh screen 74 and then fine mesh screens 76 are attached, one to each major surface of the coarse screen. Adhesive 78 holds screen structure 72 together. Alternatively, the adhesive may be applied to screens 76 instead of being applied to the coarse screen. Similarly, adhesive 80 is applied between the corresponding surfaces of the fine mesh screens and hydrogen-selective membranes 46 may then be adhesively secured to the opposed surfaces of the fine mesh screens. As discussed herein, the adhesive is at least substantially, or completely, removed after fabrication of the membrane envelope and/or membrane modules so as to not interfere with the operation of the membrane envelopes.

It is within the scope of the invention that the screen members may be of similar or the same construction, and that more or less screen members may be used. It is also within the scope of the invention that any suitable supporting medium that enables permeated gas to flow in the harvesting conduit generally parallel and transverse to the membranes may be used. For example, porous ceramics, porous carbon, porous metal, ceramic foam, carbon foam, and metal foam may be used to form screen structure 70, either alone, or in combination with one or more screen members 73. As another example, fine mesh screens 76 may be formed from expanded metal instead of a woven mesh material. Preferably, screen structure 70 is formed from a corrosion-resistant material that will not impair the operation of the membrane module and devices with which the membrane module is used. Examples of suitable materials for metallic screen members include stainless steels, titanium and alloys thereof, zirconium and alloys thereof, corrosion-resistant alloys, including Inconel™ alloys, such as 800H™, and Hastelloy™ alloys, and alloys of copper and nickel, such as Monel™.

Figure 9:
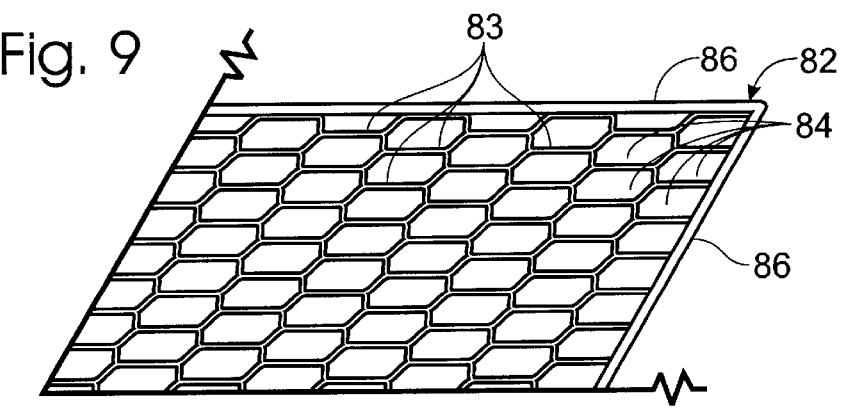
FIG. 9 is a fragmentary isometric view of an expanded metal screen member suitable for use in the screen structure of FIG. 7.
Figure 12:
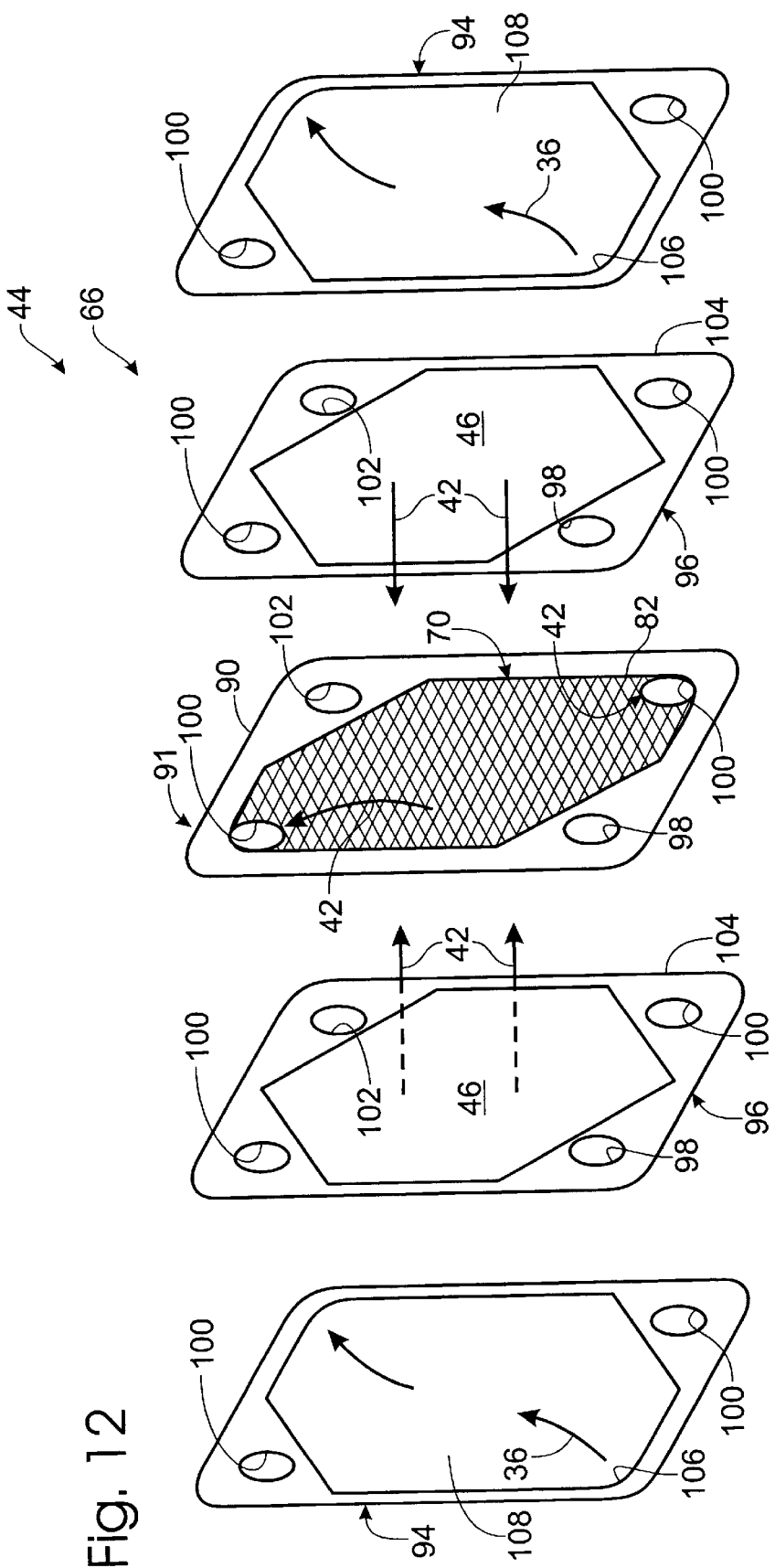
FIG. 12 is an exploded isometric view of another membrane envelope constructed according to the present invention.

An example of an expanded metal screen member is shown in FIG. 9 and generally indicated at 82. Expanded metal sheets include a latticework 83 of metal that defines a plurality of apertures 84 through which permeated gas may flow. Although other processes may be used, expanded metal sheets may be formed from scoring a sheet of metal and then stretching the metal to provide apertures, such as apertures 84 at the scores. It should be understood that the expanded metal screen member has been schematically illustrated in FIG. 9, and that the actual shape of the apertures may vary and will often have shapes that generally resemble diamonds, parallelograms or other geometric shapes, for example as shown in FIG. 12. The sheet may also include a solid perimeter region 86, which is advantageous because it is free from projections, burrs, or other wire ends that may be present in woven mesh screen members and which may pierce or otherwise damage the hydrogen-selective membranes. Although only a portion of expanded metal screen member 82 is shown in FIG. 9, the perimeter region 86 of the screen member may extend all the way around the screen member. Alternatively, only the perimeter regions that contact membranes 46 may be solid surfaces.

All of the foregoing metallic screen compositions may include a coating 85 on the surface against which the permeate sides of the membranes are supported (such as shown in FIG. 8). Examples of suitable coatings include aluminum oxide, tungsten carbide, tungsten nitride, titanium carbide, titanium nitride, and mixtures thereof. These coatings are generally characterized as being thermodynamically stable with respect to decomposition in the presence of hydrogen. Suitable coatings are formed from materials, such as oxides, nitrides, carbides, or intermetallic compounds, that can be applied as a coating and which are thermodynamically stable with respect to decomposition in the presence of hydrogen under the operating parameters (temperature, pressure, etc.) in which the membrane module will be subjected. Alternatively, the coating may be applied to an expanded metal screen member that is used in place of a fine mesh screen, in which case the coating would be applied to at least the surface of the expanded mesh that will contact the hydrogen-selective membrane 46. Suitable methods for applying such coatings to the screen or expanded metal screen member include chemical vapor deposition, sputtering, thermal evaporation, thermal spraying, and, in the case of at least aluminum oxide, deposition of the metal (e.g., aluminum) followed by oxidation of the metal to give aluminum oxide. In at least some embodiments, the coatings may be described as preventing intermetallic diffusion between the hydrogen-selective membranes and the screen structure.

Preferably, the screen structure and membranes are incorporated into a membrane module that includes frame members 88 that are adapted to seal, support and/or interconnect the membrane envelopes for use in fuel processing systems, gas purification systems, and the like. Fine mesh metal screen 76 fits within permeate frame 90. Expanded metal screen member 86 may either fit within permeate frame 90 or extend at least partially over the surface of permeate frame 90. Examples of suitable frame members 88 include supporting frames and/or gaskets. These frames, gaskets or other support structures may also define, at least in part, the fluid conduits that interconnect the membrane envelopes in an embodiment of membrane module 44 that contains two or more membrane envelopes. Examples of suitable gaskets are flexible graphite gaskets, although other materials may be used, such as depending upon the operating conditions in which a particular membrane module is used.

Figure 10:
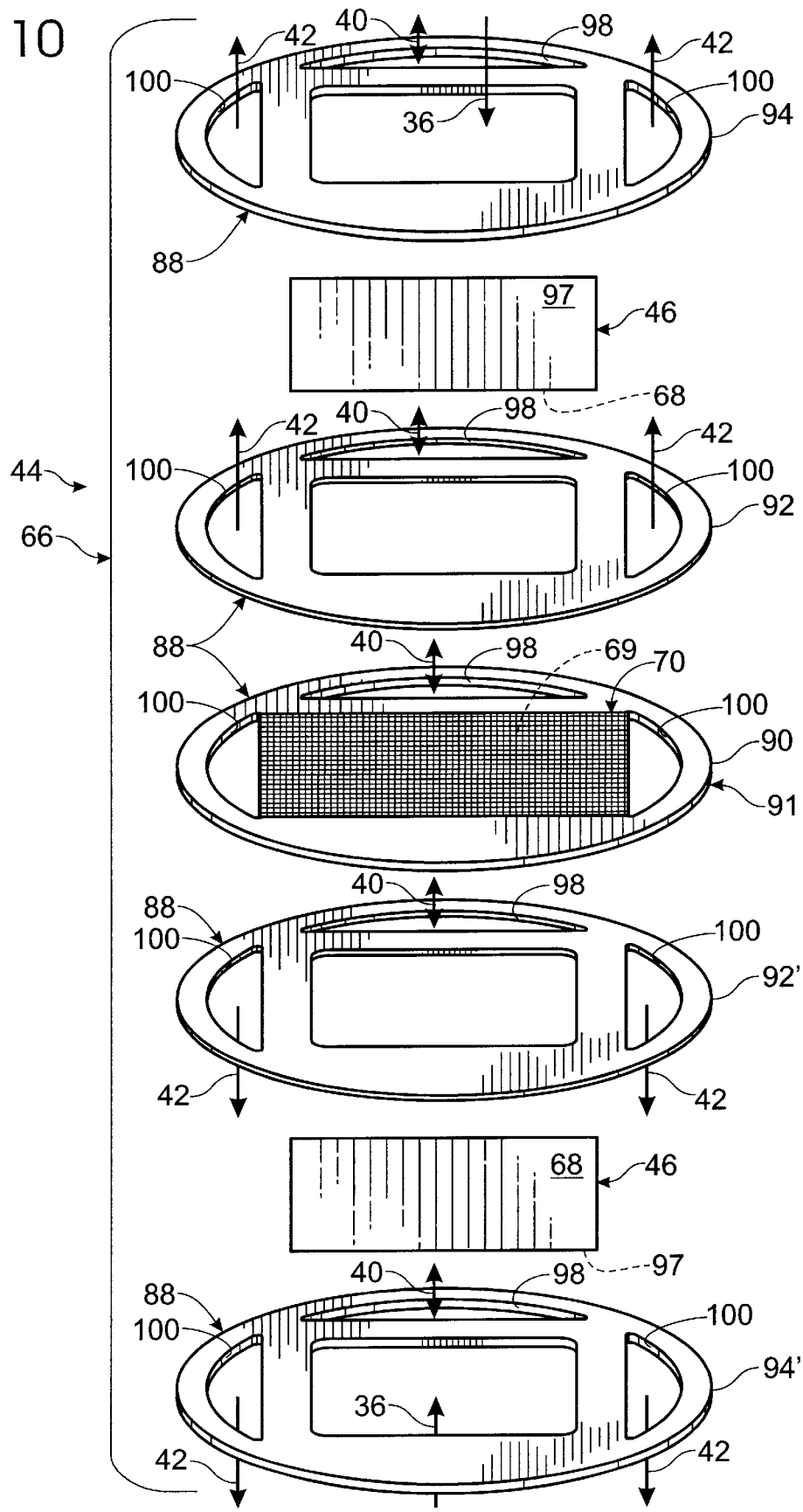
FIG. 10 is an exploded isometric view of another membrane envelope according to the present invention.

An example of a membrane envelope 66 that includes frame members 88 is shown in FIG. 10. As shown, screen structure 70 is placed in a permeate frame 90 that forms a portion of membrane module 44. The screen structure and frame 90 may collectively be referred to as a screen frame or permeate frame 91. Permeate gaskets 92 and 92' are attached to permeate frame 90, preferably but not necessarily, by using another thin application of adhesive. Next, membranes 46 are attached to screen structure 70 using a thin application of adhesive, such as by spraying or otherwise applying the adhesive to either or both of the membrane and/or screen structure. Care should be taken to ensure that the membranes are flat and firmly attached to the corresponding screen member 73. Finally, feed plates, or gaskets, 94 and 94' are optionally attached, such as by using another thin application of adhesive. The resulting membrane assembly is then stacked with feed, or end, plates to form membrane module 44. Optionally, two or more membrane envelopes may be stacked between the end plates.

Figure 11:
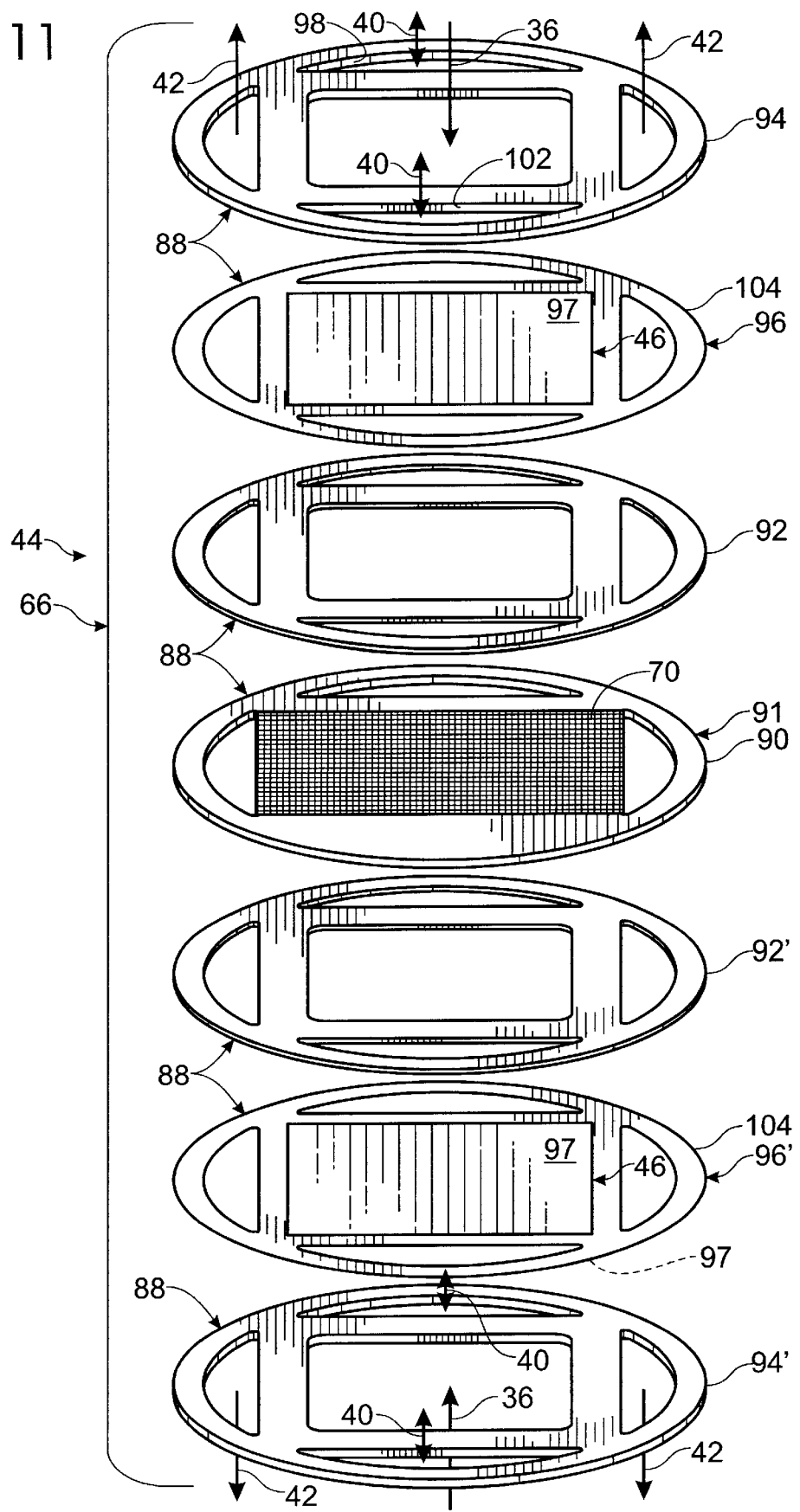
FIG. 11 is an exploded isometric view of another membrane envelope constructed according to the present invention.

Optionally, each membrane 46 may be fixed to a frame 104, such as a metal frame and such as shown in FIG. 11. If so, the membrane is fixed to the frame, for instance by ultrasonic welding or another suitable attachment mechanism, and the membrane-frame assembly is then attached to screen structure 70 using adhesive. Other examples of attachment mechanisms achieve gas-tight seals between plates forming membrane envelope 66, as well as between the membrane envelopes, include one or more of brazing, gasketing, and welding. The membrane and attached frame may collectively be referred to as a membrane plate 96.

For purposes of illustration, the geometry of fluid flow through membrane envelope 66 is described with respect to the embodiment of envelope 66 shown in FIG. 10. As shown, a mixed gas stream, such as reformate stream 36, is delivered to the membrane envelope and contacts the outer surfaces 97 of membranes 46. The hydrogen gas that permeates through the membranes enters harvesting conduit 69, which is formed between the permeate faces 68 of the membranes. The harvesting conduit is in fluid communication with conduits 100 through which the permeate stream may be withdrawn from the membrane envelope. The portion of the mixed gas stream that does not pass through the membranes flows to a conduit 98 through which this gas may be withdrawn as byproduct stream 40. In FIG. 10, a single byproduct conduit 98 is shown, while in FIG. 11 a pair of conduits 98 and 102 are shown to illustrate that any of the conduits described herein may alternatively include more than one fluid passage. It should be understood that the arrows used to indicate the flow of streams 40 and 42 have been schematically illustrated, and that the direction of flow through conduits 98, 100 and 102 may vary, such as depending upon the configuration of a particular membrane module. Also shown in FIG. 10 are other illustrative examples of frame members 88, and in FIG. 11 frame members 88 and membrane plates 96 are shown.

In FIG. 12, another example of a suitable membrane envelope 66 is shown. For purposes of illustration, envelope 66 is shown having a generally rectangular form. The envelope of FIG. 12 also provides another example of a membrane envelope having a pair of byproduct conduits 98 and 102 and a pair of hydrogen conduits 100. As shown, envelope 66 includes gaskets or spacer plates 94 as the outer most plates in the stack. Generally, each of spacer plates includes a frame 106 that defines an inner open region 108. Each inner open region 108 couples laterally to conduits 98 and 102. Conduits 100, however, are closed relative to open region 108, thereby isolating the hydrogen-rich stream 42. Membrane plates 96 lie adjacent and interior to plates 94. Membrane plates 96 each include as a central portion thereof a hydrogen-selective membrane 46, which may be secured to an outer frame 104 that is shown for purposes of illustration. In plates 96, all of the ports are closed relative to membrane 46. Each membrane lies adjacent to a corresponding one of open regions 108, i.e., adjacent to the flow of mixed gas arriving to the envelope: This provides opportunity for hydrogen to pass through the membrane, with the remaining gases, i.e., the gases forming byproduct stream 40, leaving open region 108 through conduit 102. Screen plate 91 lies intermediate membrane plates 96, i.e., on the interior or permeate side of each of membranes 46. Screen plate 91 includes a screen structure 70. Conduits 98 and 102 are closed relative to the central region of screen plate 91, thereby isolating the byproduct stream 40 and the reformate-rich flow 36 from hydrogen-rich stream 42. Conduits 100 are open to the interior region of screen plate 91. Hydrogen, having passed through the adjoining membranes 46, travels along and through screen structure 70 to conduits 100 and eventually to an output port as the hydrogen-rich stream 42.

Figure 13:
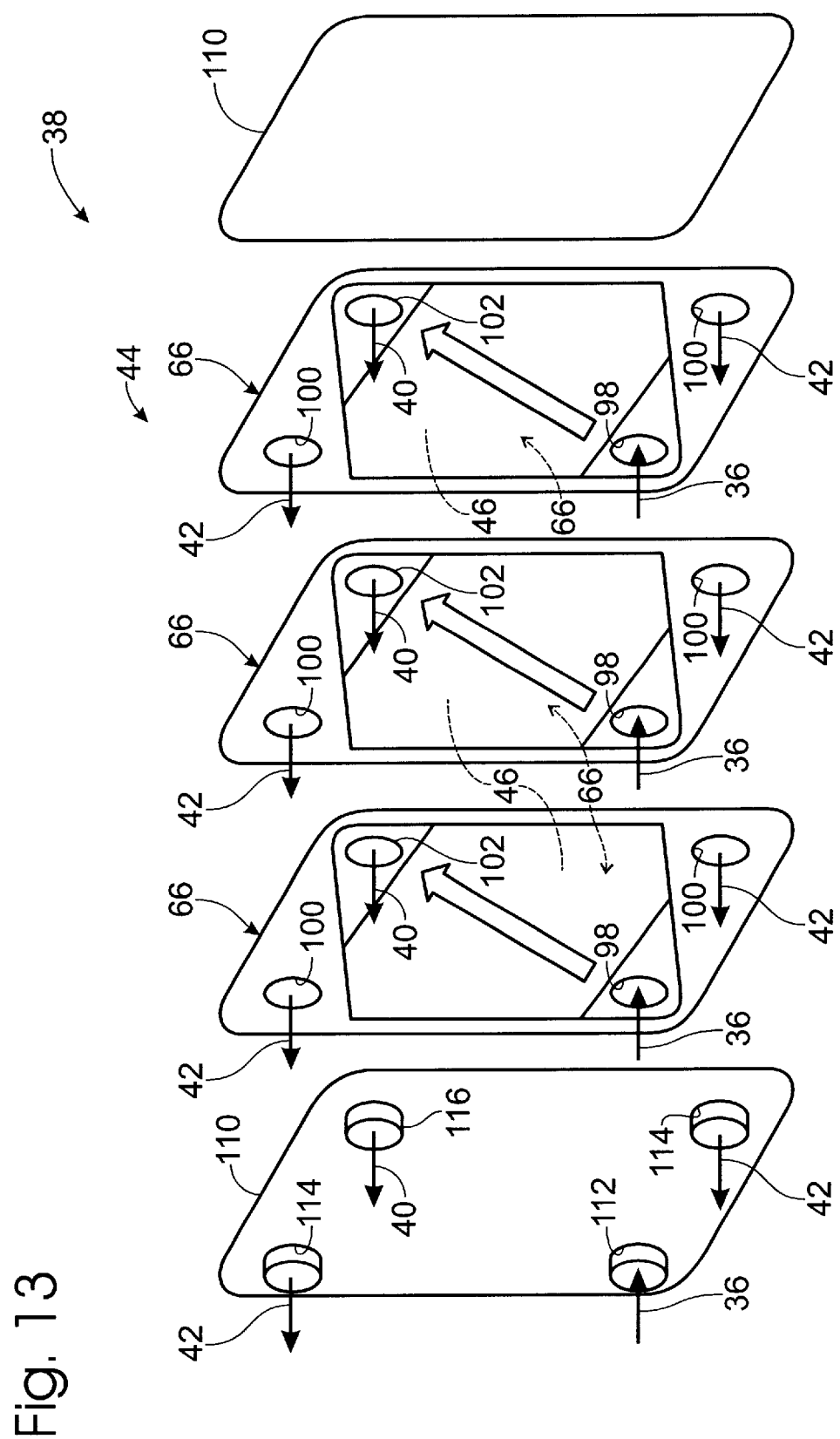
FIG. 13 is an exploded isometric view of another membrane module constructed according to the present invention.

As discussed, membrane module 44 may include one or more membrane envelopes in which the membranes have been adhesively bonded to the screen structure, and/or in which the screen structure includes two or more screen members 83 that are adhesively bonded together. Typically, the membrane module further includes end plates having input and output ports through which the mixed gas, product (or hydrogen-rich) and byproduct streams are removed from the membrane module. An example of a suitable membrane module is shown in FIG. 13 in the form of a plate membrane module. As shown, the module contains end plates 110 between which one or more membrane envelopes 66 are contained. In the illustrated embodiment, three membrane envelopes are shown for purposes of illustration, but it should be understood that more or less envelopes may be used. The membrane envelopes are in fluid communication with at least one of the end plates, through which the mixed gas stream is delivered and from which the byproduct 40 and hydrogen-rich 42 streams are removed.

Figure 15:
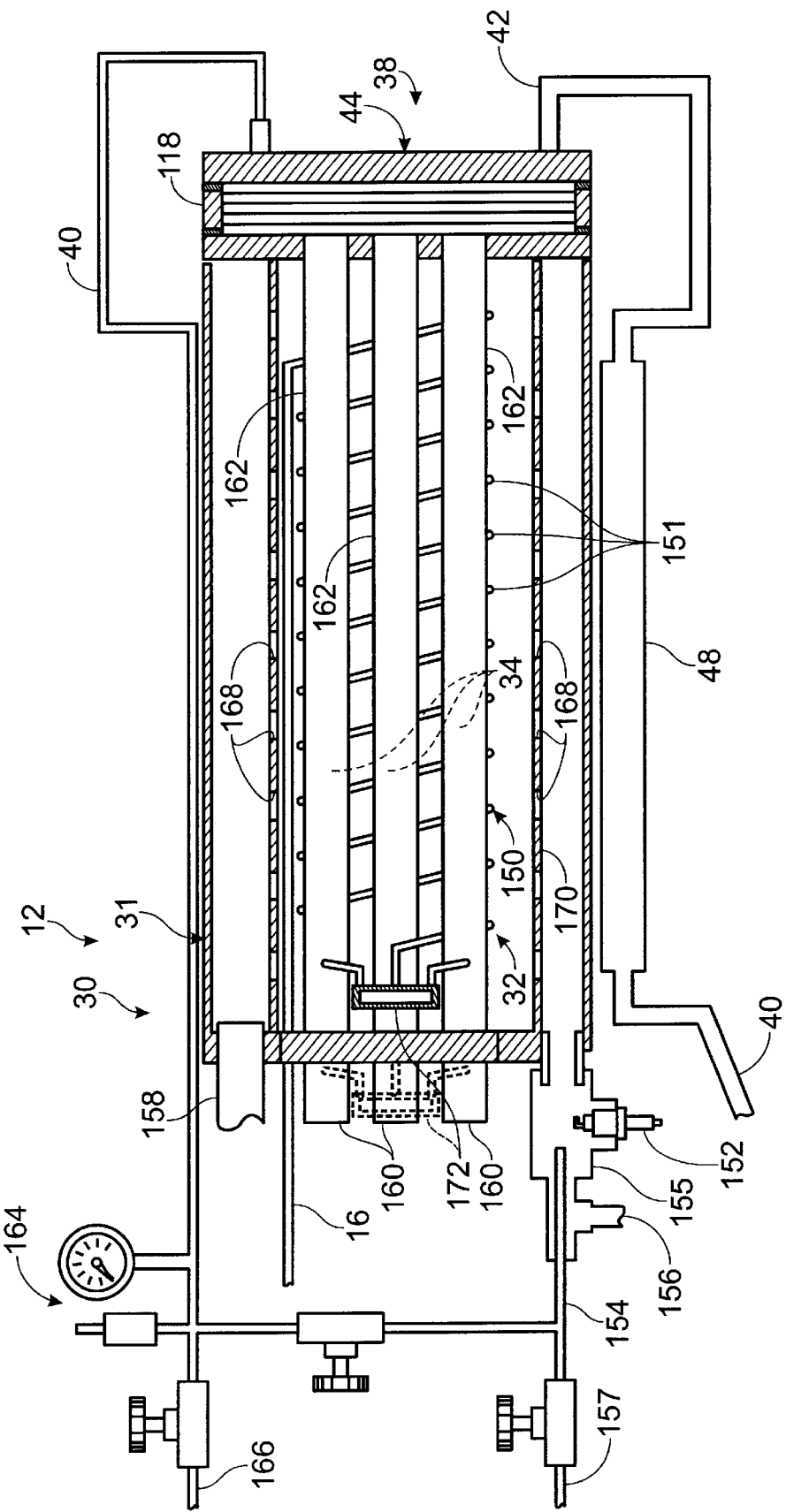
FIG. 15 is a cross-sectional view of another fuel processor that includes a membrane module constructed according to the present invention.

As shown in the illustrative embodiment of FIG. 13, one of the end plates contains a reformate input port 112 for a mixed gas stream, such as reformate stream 36 or any of the other feeds to the membrane modules discussed herein. The end plates further include a pair of exit ports 114 for permeate, or hydrogen-rich, stream 42 and an exit port 116 for byproduct stream 40. It should be understood that the number and sizing of the ports for each stream may vary, and that at least one of the ports may be contained on the other end plate or elsewhere on the membrane module, such as on a housing 118 between the end plates, such as shown in FIG. 15. As shown, the membrane envelopes include conduits 98, 100 and 102 that establish fluid communication with the input and exit ports and between the membrane envelopes. When membrane envelopes 66 are stacked, these various ports align and provide fluid conduits.

In operation, reformate gas is introduced to the membrane module through port 112 and is delivered to the membrane envelopes. Hydrogen gas that passes through the hydrogen-selective membranes 46 flows to conduits 100 and is removed from the membrane module through ports 114. The rest of the reformate gases, namely the portion that does not pass through the hydrogen-selective membranes, flows to conduit 102 and is removed from the membrane module as byproduct stream 40 through port 116.

It should be understood that the geometry of the frame members, gaskets, membranes and screen members shown in the FIGS. 7–13 are provided as illustrative examples, and it should be understood that these components may be of any suitable shape. For example, illustrations of circular and rectangular plate membrane envelopes are illustrated in FIGS. 10–13 for purposes of illustration. Other shapes, and other configurations, such as tubular configurations, are also within the scope of the present invention. Similarly, the configuration and orientation of the passages through the gaskets and plates may vary, depending upon the particular application with which the membrane module will be used.

Membrane modules containing the palladium alloy membranes that are adhesively bonded to screen structure 70 preferably are subjected to oxidizing conditions prior to initial operation of the membrane module to remove the adhesive. If adhesive is not fully removed prior to operation, the carbon residue from the adhesive can alloy with the palladium-alloy membrane and cause a decline in hydrogen permeability. In extreme cases, carbon alloying with the palladium-alloy membrane can form a brittle alloy that physically fails under operating conditions.

The objective of the oxidative conditioning is to burn out the adhesive without excessively oxidizing the palladium-alloy membrane. One set of suitable conditions using the above membrane compositions and adhesive is to heat the membrane module to 200° C. while passing air over both the feed side and the permeate side of the membrane. A preferred method is to heat the membrane module to 200° C. while the feed side is pressurized to a pressure greater than the permeate side of the membranes using a slow purge of air (>1 mL/min). Pressures in the range of approximately 50 psig to approximately 200 psig have proven effective. Air at approximately ambient pressure is passed over the permeate side of the membrane at a rate >1 mL/min. These conditions are maintained for approximately 15–25 hours. Then the temperature is increased to 400° C., while maintaining air pressure and flow rate over the feed and permeate sides of the membranes. The temperature is held at 400° C. for approximately 2–5 hours. After completing this oxidative conditioning of the membrane module, the adhesive has been burned out of the membrane module and the module is ready to accept a hydrogen-containing feed stream to be purified. Experiments have shown that these methods result in, membrane modules containing membranes that are free of wrinkles and without excessive carbon contamination.

It should be understood that the conditions described above were presented to provide an illustrative example and that the operating conditions may vary. For example, different conditions may be used because of such factors as different membrane compositions, different membrane thicknesses, and different adhesives. Similarly, the invented method using an adhesive to secure hydrogen-selective membranes on one or more support screens may be used with purification assemblies other than the fuel processing assemblies described herein and in the incorporated patent applications.

Figure 14:
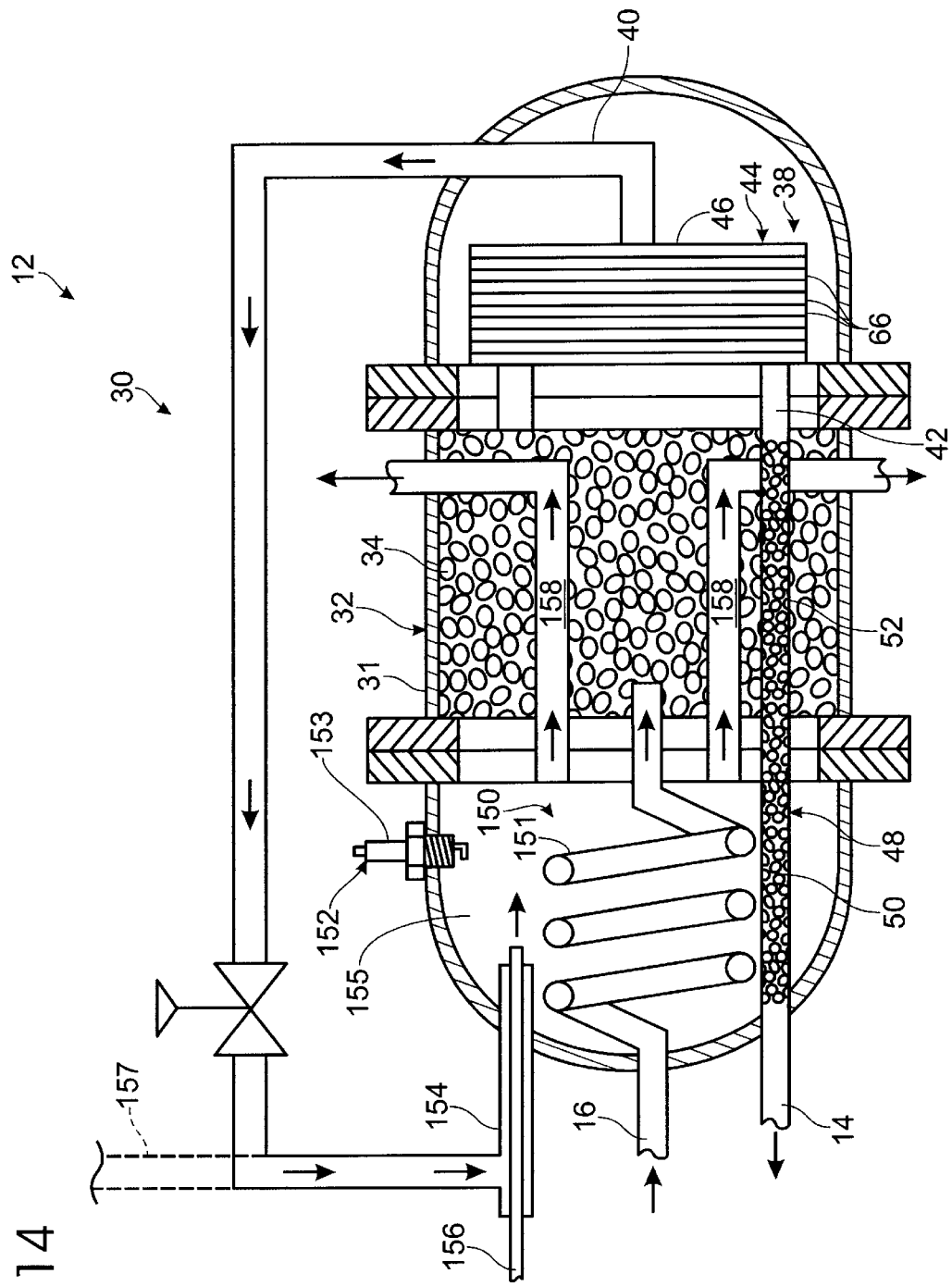
FIG. 14 is a cross-sectional view of a fuel processor that includes a membrane module constructed according to the present invention.

An example of a fuel processor 12 containing a membrane module 44 according to the present invention is shown in FIG. 14. In the illustrated embodiment, fuel processor 12 is shown as a steam reformer 30 that contains reforming catalyst 34. Alternatively, reformer 30 may be an autothermal reformer that contains an autothermal reforming catalyst bed. It should be understood that fuel processor 12 may be any device adapted to produce hydrogen gas, such as those discussed herein.

In the embodiment of steam reformer 30 shown in FIG. 14, a feed stream 16 is delivered to a vaporization region 150, which as shown contains a vaporization coil 151 in which the feed stream is vaporized. For a steam reformer, a suitable feed stream includes water and a carbon-containing feedstock, such as one or more alcohols or hydrocarbons. When the carbon-containing feedstock is miscible with water, the feedstock and water may be mixed and then vaporized. When the carbon-containing feedstock is not miscible with water, the water is typically vaporized and then mixed with the carbon-containing feedstock. In the illustrated embodiment, vaporization coil 151 is contained within the shell 31 of the reformer. It is within the scope of the invention that the vaporization region (and coil) may be located external the shell of the fuel processor, such as extending around the shell or otherwise located outside of the shell.

The vaporized feed stream is then delivered to hydrogen-producing region 32, which in the context of a reformer, contains at least one reforming catalyst bed. The reformate stream, which is a mixed gas stream containing hydrogen gas and other gases, 36 is then delivered to membrane module 44, which separates the mixed gas stream into hydrogen-rich stream 42 and byproduct stream 40, as discussed above. The illustrated reformer demonstrates that the byproduct stream may be used to provide some or all of the fuel for the reformer's heating assembly 152. Heating assembly 152 includes a heating element 153, which in the illustrated embodiment takes the form of a spark plug. Examples of other suitable heating elements include glow plugs, pilot lights, combustion catalysts, resistance heaters, and combinations thereof, such as a glow plug in combination with a combustion catalyst.

Heating assembly 152 consumes a fuel stream 154, which may be a combustible fuel stream or an electric current, depending upon the type of heating element used in the heating assembly. In the illustrated embodiment, the heating assembly forms part of a combustion chamber, or region, 155, and the fuel stream includes a combustible fuel and air from an air stream 156. The fuel may come from an external source, such as schematically illustrated at 157, or may be at least partially formed from the byproduct stream 40 from membrane module 44. It is within the scope of the invention that at least a portion of the fuel stream may also be formed from product hydrogen stream 14. In the illustrated embodiment, the exhaust from combustion region 155 flows through heating conduits 158 in reforming region 32 to provide additional heating to the reforming region. Conduits 158 may take a variety of forms, including finned tubes and spirals, to provide sufficient surface area and desirable uniform distribution of heat throughout reforming region 32.

In FIG. 15, another illustrative example of a steam reformer containing a membrane module 44 constructed according to the present invention is shown. As shown, the reforming region includes a plurality of reforming catalyst tubes 162 that contain reforming catalyst 34. The vaporized feed stream from vaporization region 150 is delivered to tubes 162 via a manifold 172 that distributes the feed stream between reforming catalyst tubes. As shown in dashed lines in FIG. 15, the manifold may alternatively be located external shell 31 to enable access to the manifold from external the shell, such as to adjust the relative distribution of the vaporized feed stream between the reforming catalyst tubes. Similarly, portions 160 of the reforming catalyst tubes are also shown extending beyond shell 31.

The steam reformer of FIG. 15 also provides an example of a fuel processor 12 in which the byproduct stream may be either used as a portion of fuel stream 154 for combustion region 155, vented (such as through pressure-relief valve assembly 164), or delivered through fluid conduit 166 for storage or use outside of fuel processor 12. Also shown in FIG. 15 are flow regulators 168 for heat produced by heating assembly 152 in combustion region 155. In the illustrated embodiment, regulators 168 take the form of apertures in a combustion manifold 170. The apertures regulate the path along which combustion exhaust travels from combustion region 155 and through reforming region 32. Examples of suitable placement of the apertures include one or more apertures distal heating assembly 152, and a plurality of apertures distributed along the length of manifold 170. When a distribution of spaced-apart apertures is used, the apertures may be evenly spaced, or the openings may be more prevalent distal the burner. Similarly, the size of the apertures may be uniform, or may vary, such as using larger apertures away from heating assembly 152.

It should be understood that the steam reformers shown in FIGS. 14 and 15 are shown and described for purposes of illustration and should not be construed as providing exclusive embodiments of fuel processors or steam reformers with which the invented membrane modules may be used. Instead, the structure and components of reformers and fuel processors containing membrane modules according to the invention may vary.

As discussed above, membranes 46 may be formed from a variety of materials and by a variety of methods, including a method that involves etching a membrane to reduce the thickness of at least a portion thereof to increase the hydrogen-permeability of the membrane. Although not required for the above-described membrane envelopes, modules, hydrogen purifiers, and the like, etching a hydrogen-permeable (and selective) membrane to reduce the thickness of at least a portion thereof has been demonstrated to effectively increase the hydrogen flux through the membrane compared to a membrane that has not been etched.

Figure 16:
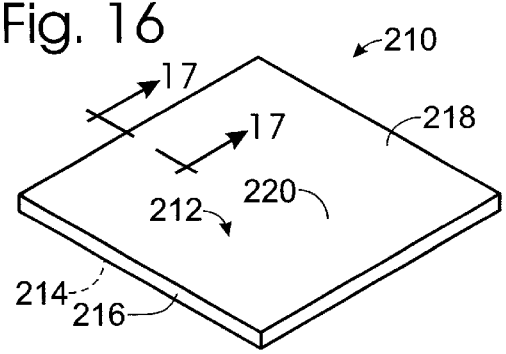
FIG. 16 is an isometric view of an unetched hydrogen-permeable metal membrane.

An unetched hydrogen-permeable membrane is shown in FIG. 16 and indicated generally at 210. As discussed, membrane 210 may, but is not required to, represent any of the previously described and illustrated membranes 46. Similarly, the subsequently described etched membrane 230 may, but is not required to, take the place of any of the previously described, illustrated and/of incorporated membranes. Membrane 210 includes a pair of generally opposed surfaces 212 and 214 and an edge 216 joining the perimeters of the surfaces. Each surface 212 and 214 includes an outer edge region 218 that surrounds a central region 220. Membrane 210 is typically roll formed and, as shown, has a generally rectangular, sheet-like configuration with a constant thickness. It should be understood that membrane 210 may have any geometric or irregular shape, such as by cutting the formed membrane into a desired shape based on user preferences or application requirements. It is within the scope of the invention that any suitable method for forming membrane 210 may be used. For example, membrane 210 may also be formed from such processes as electro deposition, sputtering or vapor deposition.

Figure 17:
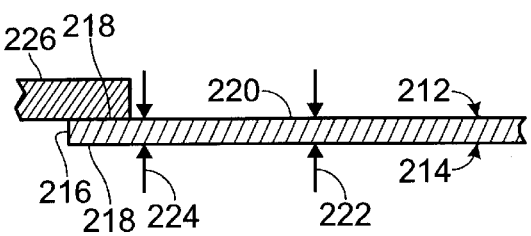
FIG. 17 is a cross-sectional detail of the membrane of FIG. 16 with an attached frame.

In FIG. 17, membrane 210 is shown in cross-section, and it can be seen that the thickness 222 of the membrane measured between the central regions is the same as the thickness 224 measured between the edge regions. In the figures, it should be understood that the thicknesses of the membranes and subsequently described absorbent media and frame have been exaggerated for purposes of illustration. Typically, hydrogen-permeable membranes have thicknesses less than approximately 50 microns, although the disclosed etching process may be used with thicker membranes.

Also shown in FIG. 17 is a portion of a frame 226, which may be secured to the membrane, such as around a portion or the entire edge region 218. Frame 226 is formed from a more durable material than the membrane and provides a support structure for the membrane. Frame 226 may be secured to one or both surfaces of the membrane. It should be understood that the invented membrane may be formed without frame 226. In another variation, frame 226 may take the form of a compressible gasket that is secured to the membrane, such as with an adhesive or other suitable structure or process. Compressible gaskets are used to form gas-tight seals around and/or between the membranes.

In use, membrane 210 provides a mechanism for removing hydrogen from mixtures of gases because it selectively allows hydrogen to permeate through the membrane. The flowrate, or flux, of hydrogen through membrane 210 typically is accelerated by providing a pressure differential between a mixed gaseous mixture on one side of the membrane, and the side of the membrane to which hydrogen migrates, with the mixture side of the membrane being at a higher pressure than the other side.

Membrane 210 is formed of a hydrogen-permeable metal or metal alloy, such as palladium or a palladium alloy. An example of such an alloy is comprised of 60 wt % palladium and 40 wt % copper (generally known as Pd-40Cu). Because palladium and palladium alloys are expensive, the thickness of the membrane should be minimal; i.e., as thin as possible without introducing an excessive number of holes in the membrane. Holes in the membrane are not desired because holes allow all gaseous components, including impurities, to pass through the membrane, thereby counteracting the hydrogen-selectivity of the membrane.

It is known to roll form hydrogen-permeable metal membranes, such as membrane 210, to be very thin, such as with thicknesses of less than approximately 50 microns, and more commonly with thicknesses of approximately 25 microns. The flux through a hydrogen-permeable metal membrane is inversely proportional to the membrane thickness. Therefore, by decreasing the thickness of the membrane, it is expected that the flux through the membrane will increase, and vice versa. In Table 1, below, the expected flux of hydrogen through various thicknesses of Pd-40Cu membranes is shown.

TABLE 1

Expected hydrogen flux through Pd-40 Cu membranes at 400° C. and 100 psig hydrogen feed, permeate hydrogen at ambient pressure.

| Membrane Thickness | Expected Hydrogen Flux |
| --- | --- |
| 25 micron | 60 mL/cm$^2$ · min |
| 17 micron | 88 mL/cm$^2$ · min |
| 15 micron | 100 mL/cm$^2$ · min |

Besides the increase in flux obtained by decreasing the thickness of the membrane, the cost to obtain the membrane also increases as the membrane's thickness is reduced. Also, as the thickness of a membrane decreases, the membrane becomes more fragile and difficult to handle without damaging.

Through the etching process, or method, of the present invention, discussed in more detail subsequently, the thickness of a portion of the membrane, such as central portion 220, may be selectively reduced, while leaving the remaining portion of the membrane, such as edge region 218, at its original thickness. Therefore, greater flux is obtained in the thinner etched region, while leaving a thicker, more durable edge region that bounds the central region and thereby provides support to the membrane.

Figure 18:
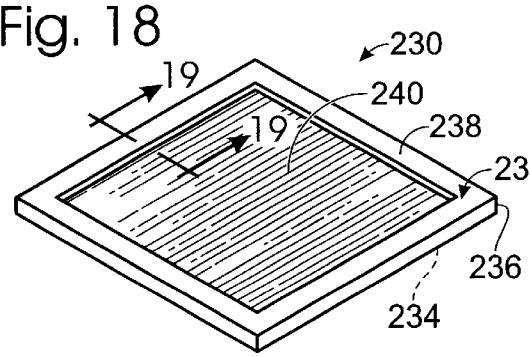
FIG. 18 is an isometric view of the membrane of FIG. 16 after being etched according to a method of the present invention.
Figure 19:
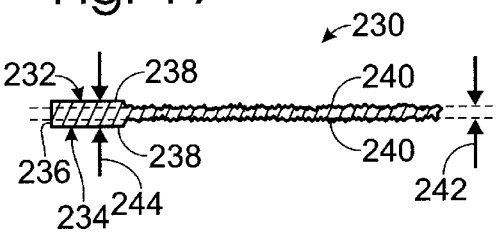
FIG. 19 is a cross-sectional detail of the membrane of FIG. 18.

For example, an etched membrane prepared according to an etching method of the present invention is shown in FIG. 18 and illustrated generally at 230. Like membrane 210, membrane 230 includes a pair of generally opposed surfaces 232 and 234 and an edge 236 joining the surfaces. Each surface 232 and 234 includes an outer edge region 238 that surrounds a central region 240. Membrane 230 is formed from any of the above-discussed hydrogen-permeable metal materials, and may have any of the above-discussed configurations and shapes. The etching process works effectively on work-hardened, or non-annealed membranes. Alternatively, the membranes may be annealed prior to the etching process. Unlike membrane 210, however, the thickness 242 of membrane 230 measured between central regions 240 is less than the thickness 244 measured between the edge regions, as schematically illustrated in FIG. 19. Therefore, the hydrogen flux through the central region will be greater than that through the edge region, as expected from the above discussion of the inversely proportional relationship between membrane thickness and hydrogen flux.

However, an unexpected benefit of chemically etching the membrane, as disclosed herein, is that the hydrogen flux through the etched region exceeds that expected or measured through roll-formed membranes of equal thickness. As shown below in Table 2, the method of the present invention yields a hydrogen-permeable metal membrane with significantly greater flux than unetched membranes of similar thicknesses.

TABLE 2

Hydrogen flux through etched and unetched Pd-40 Cu membranes at 400° C. and 100 psig hydrogen feed, permeate hydrogen at ambient pressure. Aqua regia etchant.

| Etching Time | Membrane Thickness | Observed Hydrogen Flux | Expected Hydrogen Flux |
| --- | --- | --- | --- |
| None | 25 micron | 60 mL/cm$^2$ · min | 60 mL/cm$^2$ · min |
| 2.0 mins. | 17 micron | 94 mL/cm$^2$ · min | 88 mL/cm$^2$ · min |
| 2.5 mins. | 15 micron | 122 mL/cm$^2$ · min | 100 mL/cm$^2$ · min |

As the above table demonstrates, the invented method produces hydrogen-permeable metal membranes that permit increased hydrogen throughput compared to unetched membranes of similar thickness by increasing the roughness and surface area of the etched region of the membrane. Perhaps more importantly, this increase in throughput is achieved without sacrificing selectivity for hydrogen or the purity of the harvested hydrogen gas, which is passed through the membrane.

Increasing the surface roughness of the membrane is especially beneficial as the thickness of the membrane is reduced to less than 25 microns, especially less than 20 microns. As the membrane thickness is reduced, the surface reaction rates governing the transport of gaseous molecular hydrogen onto the surface of the metal membrane become more important to the overall permeation rate of hydrogen across the membrane. In extreme cases in which the membrane is quite thin (less than approximately 15 microns) the surface reaction rates are significant in governing the overall permeation rate of hydrogen across the membrane. Therefore, increasing the surface area increases the rate of hydrogen permeation. This contrasts with relatively thick membranes (greater than 25 microns) in which the surface reaction rates are less important and the overall permeation rate of hydrogen across the membrane is governed by the bulk diffusion of hydrogen through the membrane.

Thus the etching process results in an overall reduction in the thickness of the membrane and an increase in the surface roughness (and surface area) of the membrane. These improvements yield an increase in hydrogen flux and reduce the amount of material (e.g., palladium alloy) that is required, while still maintaining the membrane's selectivity for hydrogen.

In the invented etching process, an etchant is used to selectively reduce the thickness of the membrane. When the etchant removes, or etches, material from the surface of a membrane, the etchant also increases the surface roughness and surface area of the membrane in the etched region.

Examples of suitable etchants are oxidizing agents and acids. For example, oxidizing acids such as nitric acid. Other suitable examples are combinations of nitric acid with other acids, such as aqua regia (a mixture of 25 vol % concentrated nitric acid and 75 vol % concentrated hydrochloric acid). Another specific example of an etchant well-suited to use in the present invention is a mixture comprising 67 wt % concentrated nitric acid and 33 wt % aqueous solution of poly(vinyl alcohol). A suitable method of preparing the aqueous solution of poly(vinyl alcohol) is to dissolve 4 wt % of poly(vinyl alcohol) (average molecular weight 124,000 to 186,000; 87% to 89% hydrolyzed; Aldrich Chemical Company, Milwaukee, Wis.) in de-ionized water. The disclosed examples of etchants are for illustrative purposes, and should not be construed to be limiting examples. For example, the relative percentage of acid may be increased or decreased to make the etchant respectively more or less reactive, as desired.

In a first method of the present invention, a selected etchant is applied to at least one of the surfaces of the membrane. Once applied, the etchant removes material from the surface of the membrane, thereby increasing its surface roughness and reducing the thickness of the membrane in the etched region. After a defined time period, the etchant is removed. The etching process disclosed herein typically is conducted under ambient conditions (temperature and pressure), although it should be understood that the process could be conducted at elevated or reduced temperatures and pressures as well.

The etching process is limited either by the time during which the membrane is exposed to the etchant, or by the reactive elements of the etchant. In the latter scenario, it should be understood that the etching reaction is self-limiting, in that the reaction will reach an equilibrium state in which the concentration of dissolved membrane in the etchant solution remains relatively constant. Regardless of the limiting factor in the process, it is important to apply a volume and concentration of etchant for a time period that will not result in the etchant creating substantial holes in, or completely dissolving, the membrane. Preferably, no holes are created in the membrane during the etching process.

When applying the etchant to a surface of membrane 210, such as to produce membrane 230, it is desirable to control the region of the surface over which the etchant extends. It is also desirable to maintain an even distribution of etchant over this application region. If the application region of the etchant is not controlled, then the etchant may remove material from other non-desired regions of the membrane, such as the edge region, or may damage materials joined to the membrane, such as an attached frame. If an even distribution of etchant is not maintained, areas of increased etchant may have too much material removed, resulting in holes in the membrane. Similarly, other areas may not have enough material removed, resulting in less than the desired reduction in thickness and increase in flux.

To control the distribution of etchant within the desired application region, an absorbent medium is placed on the membrane 210 and defines an application region to be etched. For example, in FIGS. 20 and 21, the absorbent medium is generally indicated at 250 and covers application region 252 of surface 212. As shown, medium 250 is sized to cover only a central portion of surface 212, however, it should be understood that medium 250 may be selectively sized to define application regions of any desired size and shape, up to the complete expanse of surface 212. Typically, however, only a central portion of each surface is treated, leaving an unetched perimeter of greater thickness than the central region. This unetched region, because of its greater thickness, provides strength and support to membrane 210 while still contributing to the hydrogen permeability of the membrane.

Besides being selected to absorb the particular etchant without adversely reacting to the etchant or metal membrane, it is preferable that medium 250 has a substantially uniform absorbency and diffusivity along its length. When medium 250 absorbs and distributes the etchant uniformly along its length, it distributes the etchant evenly across the application region, thereby removing substantially the same amount of material across the entire application region. The benefit of this is not only that some etchant will contact, and thereby remove material from the entire application region, but also that the etchant will be uniformly distributed across the application region. Therefore, membrane 250 prevents too much etchant being localized in an area, which would result in too much material being removed. In a region where too much etchant is applied, the excess etchant is drawn away from that region to other areas of the medium where less etchant is applied. Similarly, in a region where too little etchant is applied, the medium draws etchant to that region to produce an even distribution across the medium, and thereby across the application region.

As a result, the reduction of thickness in membrane 210 will be relatively uniform across the application region, and perhaps, more importantly, will be reproducible regardless of the exact rate and position at which the etchant is applied. Therefore, with the same size and type of medium 250 and the same volume of etchant 254, the resulting reduction in thickness should be reproducible for membranes of the same composition. Of course, it should be understood that etching removes material from the surface of the membrane, thereby resulting in an uneven, rough surface with increased surface area over an unetched surface. Therefore, the exact surface topography will not be seen. However, the average thickness measured across a section of the membrane should be reproducible. For example, in FIG. 19, the average thickness between central regions 240 is indicated with dashed lines.

Figure 20:
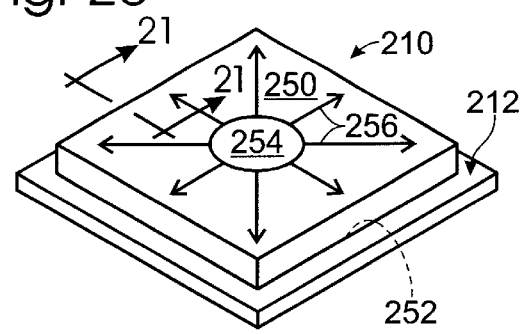
FIG. 20 is an isometric view of the membrane of FIG. 16 with an absorbent medium placed over an application region of one of the membrane's surfaces.
Figure 21:
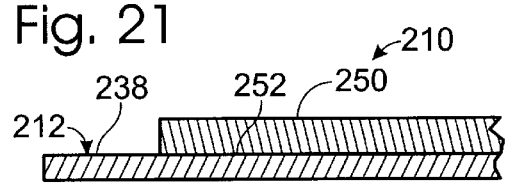
FIG. 21 is a cross-sectional detail of the membrane of FIG. 20.

Because medium 250 essentially defines the bounds of application region 252, medium 250 should be sized prior to placing it upon the surface to be etched. After placing the medium in the desired position on one of the membrane's surfaces, such as surface 212 shown in FIG. 20, a volume of etchant is applied. In FIG. 20, the applied volume of etchant is schematically illustrated at 254, with arrows 256 illustrating the absorption and distribution of etchant 254 across medium 250.

The applied volume of etchant should be no more than a saturation volume of etchant. An absorbent medium can only absorb up to a defined volume of a particular etchant per unit of medium 250 before reaching the saturation point of the medium. Therefore, it is important not to exceed this saturation point. Too much applied etchant will result in unabsorbed etchant pooling on or adjacent to the medium, such as on the upper surface of the medium 250 or around the edges of the medium. When excess etchant contacts the surface, it is likely to result in holes in the membrane because more than the desired amount of material is removed. As discussed, if these holes are numerous or large enough, they will render the membrane unusable for hydrogen purification applications, with any holes lowering the purity of the hydrogen passing through the membrane.

Therefore, to prevent too much etchant from being applied, the volume of etchant applied may approach, but should not exceed, the saturation volume of the etchant.

An example of a suitable absorbent medium is a cellulosic material, such as absorbent paper products. A particular example of an absorbent medium that has proven effective are single-fold paper towels manufactured by the Kimberly Clark company. When a three inch by three inch area of such a towel is used, approximately 2.5 mL of etchant may be applied without exceeding the saturation volume of that area. The capillary action of the cellulosic towel both absorbs the applied etchant and distributes the etchant throughout the towel. Other paper and cellulosic materials may be used as well, as long as they meet the criteria defined herein. Absorbent, diffusive materials other than cellulosic materials may be used as well.

After applying the etchant to medium 250, the etchant is allowed to remove material from the application region for a determined time period. This period is best determined through experimentation and will vary depending on such factors as the composition, thickness and desired thickness of the membrane, the absorbent medium being used, the composition and concentration of etchant, and the temperature at which the etching process is conducted. After this time period has passed, the medium is removed from the membrane, and the application, or treatment area is rinsed with water to remove any remaining etchant. After rinsing, the method may be repeated to etch another surface of the membrane.

Instead of a single etching step on each surface of the membrane, a variation of the above method includes plural etching steps for each surface to be etched. In the first step, a more reactive, or vigorous etchant is used to remove a substantial portion of the material to be removed. In the second step, a less reactive etchant is used to provide a more controlled, even etch across the application region.

As an illustrative example, Pd-40Cu alloy foil was etched first with concentrated nitric acid for 20–30 seconds using the absorbent medium technique described above. After removing the medium and rinsing and drying the membrane, a second etch with a mixture of 20 vol % neat ethylene glycol and the balance concentrated nitric acid was performed for between 1 and 4 minutes. Subsequent etching steps were performed with the glycol mixture to continue to gradually reduce the thickness of the membrane in the application region. Results of etching Pd-40Cu foil using this method are given in the table below.

TABLE 3

Results of etching Pd-40 Cu membrane with concentrated nitric acid for 30 seconds followed by subsequent etches with concentrated nitric acid diluted with 20% vol ethylene glycol.

| Etching Solution | Etching Time | Observations |
| --- | --- | --- |
| None (Virgin PD-40 Cu Foil) | N/A | Measures 0.0013 inches thick |
| 1) Conc. Nitric Acid<br>2) 20 vol % ethylene glycol/HNO$_3$ | 1) 30 seconds<br>2) 1.5 minutes | Measures 0.0008 to 0.0009 inches thick, no pin holes |
| 1) Conc. Nitric Acid<br>2) 20 vol % ethylene glycol/HNO$_3$<br>3) 20 vol % ethylene glycol/HNO$_3$ | 1) 30 seconds<br>2) 1.5 minutes<br>3) 1.5 minutes | Measures 0.0005 to 0.0006 inches thick, no pin holes |
| 1) Conc. Nitric Acid<br>2) 20 vol % ethylene glycol HNO$_3$ | 1) 30 seconds<br>2) 3 minutes | Measures 0.0005 inches thick, no pin holes in membrane |
| 1) Conc. Nitric Acid<br>2) 20 vol % ethylene glycol/HNO$_3$ | 1) 1 minute<br>2) 3 minutes | Multiple pin holes in membrane |

Other than confining the etching solution to a desired application region, another benefit of using an absorbent medium to control the placement and distribution of the etchant is that the quantity of etchant (or etching solution) that may be applied without oversaturating the medium is limited. Thus, the etching reaction may be self-limiting, depending on the choice of and composition of etchant. For instance, varying the etching time using 33.3 wt % PVA solution/66.7 wt % concentrated HNO$_3$ yielded the results shown in the following table. These results indicate that the volume of etchant that is applied at one time may limit the depth of etching, so long as the etchant is not so reactive or applied in sufficient quantity to completely dissolve the application region.

TABLE 4

Results of etching Pd-40 Cu membrane with a solution of 33.3 wt % PVA solution/66.7 wt % concentration nitric acid.

| Etching Time | Observations |
| --- | --- |
| 0 | Measures 0.0013 inches thick |
| 3 minutes | Measures 0.0011 inches thick |
| 4 minutes | Measures 0.0011 inches thick |
| 5 minutes | Measures 0.0011 inches thick |
| 6 minutes | Measures 0.0011 inches thick |
| 3 minutes, rinse, 3 minutes | Measures 0.0008 to 0.0009 inches thick |
| 3 minutes, rinse, 3 minutes, rinse, 3 minutes | Measures 0.0006 inches thick, multiple pin holes |

In a further variation of the etching method, a suitable mask may be applied to the membrane to define the boundaries of the region to be etched. For example, in FIG. 20, instead of using absorbent medium 250 to define application region 252, a non-absorbent mask could be applied around edge region 238. Because this mask does not absorb the etchant, it confines the etchant to an application region bounded by the mask. Following etching, the mask is removed. The mask may be applied as a liquid or it may be a film with an adhesive to bond the film to the membrane.

Figure 22:
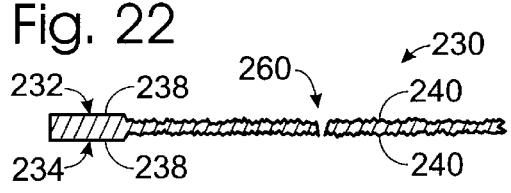
FIG. 22 is the detail of FIG. 19 with a hole indicated generally at 60.

If the chemical etching process is not properly controlled, tiny holes will appear in the membrane. For example, in FIG. 22 membrane 230 is shown with a hole 260 in its central region 240. Typically, the holes will be very small, however, the size of a particular hole will depend on the concentration and quantity of etchant applied to that region, as well as the time during which the etchant was allowed to etch material from the membrane. Holes, such as hole 260, reduce the purity of the hydrogen gas harvested through the membrane, as well as the selectivity of the membrane for hydrogen. The probability of holes forming in the membrane during the etching process increases as the thickness of the membrane is reduced. Therefore, there is often a need to repair any holes formed during the etching process.

Figure 23:
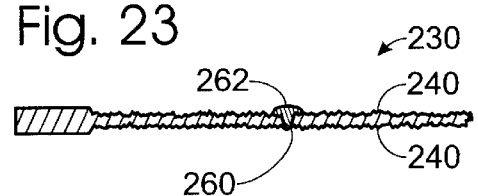
FIG. 23 is the detail of FIG. 22 with the hole repaired.

One method for detecting any such holes is to utilize a light source to identify holes in the membrane. By shining a light on one side of the membrane, holes are detected where light shines through the other side of the membrane. The detected holes may then be repaired by spot electroplating, such as by using a Hunter Micro-Metallizer Pen available from Hunter Products, Inc., Bridgewater, N.J. In FIG. 23, a patch, or plug, 262 is shown repairing hole 260. Any other suitable method may be used for repairing tiny holes resulting from etching the membrane.

The repairing step of the invented etching process also may be performed using a photolithographic method. In this case a light-sensitive, electrically insulating mask is applied to one surface of the membrane, and then the membrane is irradiated with light of the appropriate wavelength(s) from the opposite side. Any tiny holes that might be present in the membrane will allow the light to pass through the membrane and be absorbed by the light-sensitive mask. Next, the mask is washed to remove irradiated regions of the mask and thereby reveal the bare metal of the membrane. Because only the irradiated regions of the mask are removed, the remaining mask serves as an electrical insulator over the surface of the membrane. Then, all of the spots where the mask has been removed are electroplated or electroless plated at the same time.

Because the patch, or plug, represents only a minute percentage of the surface area of the membrane, the patch may be formed from a material that is not hydrogen-permeable without the flux through the membrane being noticeably affected. Of course, a hydrogen-permeable and selective patch is preferred. Suitable metals for electroplating to fill or close tiny holes in the palladium-alloy membranes include copper, silver, gold, nickel, palladium, chromium, rhodium, and platinum. Volatile metals such as zinc, mercury, lead, bismuth and cadmium should be avoided. Furthermore, it is preferable that metal applied by plating be relatively free of phosphorous, carbon, sulfur and nitrogen, since these heteroatoms could contaminate large areas of the membrane and are generally known to reduce the permeability of palladium alloys to hydrogen.

The above-described etched membranes may be used to form membrane modules adapted to be coupled to a source of hydrogen gas, as discussed and/or illustrated herein. The membrane modules include one or more hydrogen-permeable membranes and are adapted to remove impurities from a feed stream of hydrogen gas. It should be understood that the previously described membrane modules, hydrogen purifiers and fuel processors may be formed with the invented membranes, but that they may also be formed with other hydrogen permeable membranes, including unetched membranes. Similarly, the invented etched membranes may be used independent of the previously described membrane envelopes, modules, hydrogen purifiers and fuel processors.

Industrial Applicability

The present invention is applicable in any device in which a stream containing hydrogen gas is purified to produce a purified hydrogen stream. The invention is also applicable to processes in which hydrogen-selective membranes are prepared. The invention is also applicable to fuel processing systems in which hydrogen gas is produced from a feed stream and subsequently purified, such as for delivery to a fuel cell stack or other hydrogen-consuming device.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

We claim:

1. A fuel processor, comprising:
    a reforming region containing a reforming catalyst bed, wherein the reforming region is adapted to receive a carbon-containing feedstock and water and produce a mixed gas stream containing hydrogen gas and other gases therefrom; and
    a membrane module adapted to receive the mixed gas stream and to separate the mixed gas stream into a byproduct stream containing at least a substantial portion of the other gases and a product stream containing at least substantially pure hydrogen gas, wherein the membrane module includes a hydrogen-selective metal membrane having a feed side and a permeate side, wherein the product stream is formed from a portion of the mixed gas stream that passes through the membrane and the byproduct stream is formed from a portion of the mixed gas stream that does not pass through the membrane, and further wherein the hydrogen-selective membrane includes an etched region having a reduced thickness compared to an unetched region.

2. The fuel processor of claim 1, wherein the unetched region has a greater thickness than the etched region.

3. The fuel processor of claim 2, wherein the unetched region at least partially surrounds the etched region.

4. The fuel processor of claim 2, wherein the unetched region completely surrounds the etched region.

5. The fuel processor of claim 2, wherein the unetched region is mounted on a frame.

6. The fuel processor of claim 2, wherein the unetched region is adapted to permit a first hydrogen flux therethrough and the etched region is adapted to permit a greater hydrogen flux therethrough than the unetched region.

7. The fuel processor of claim 2, wherein the etched region has a thickness that is less than approximately 80% of the thickness of the unetched region.

8. The fuel processor of claim 1, wherein the etched region has an increased roughness compared to the unetched region.

9. The fuel processor of claim 1, wherein the etched region has a greater surface area per selected expanse than an equally sized expanse of the unetched region.

10. The fuel processor of claim 1, wherein the etched region has an irregular, non-uniform thickness and therefore an increased surface area compared to a uniformly etched region or the unetched region.

11. The fuel processor of claim 1, wherein the thickness of the etched region is less than 15 microns.

12. The fuel processor of claim 1, wherein the etched region is adapted to permit a greater hydrogen flux than a theoretically expected hydrogen flux through an unetched membrane region having the same composition and thickness as the etched membrane region.

13. The fuel processor of claim 1, wherein the etched region is adapted to permit a hydrogen flux that is at least 10% greater than the theoretically expected hydrogen flux through an unetched membrane region having the same composition and thickness as the etched membrane region.

14. The fuel processor of claim 1, wherein the etched region is adapted to permit a hydrogen flux that is at least 20% greater than the theoretically expected hydrogen flux through an unetched membrane region having the same composition and thickness as the etched membrane region.

15. The fuel processor of claim 1, wherein the etched region does not require chemical or physical reactivation after etching to be adapted to permit a hydrogen flux that is at least as great as the hydrogen flux expected for a membrane having the same composition and thickness as the etched membrane region.

16. The fuel processor of claim 1, wherein the hydrogen-selective membrane is formed from a palladium alloy containing copper.

17. The fuel processor of claim 1, wherein the membrane is a first hydrogen-selective metal membrane, wherein the membrane module further includes a second hydrogen-selective metal membrane having a feed side and a permeate side, and further wherein the membrane module includes a membrane envelope, wherein the membrane envelope includes the first and the second hydrogen-selective metal membranes, with the membranes oriented such that their permeate sides are separated by a support, wherein the support defines a permeate channel between the membranes through which the portion of the mixed gas stream that permeates through at least one of the membranes to the permeate channel may be removed from the membrane envelope.

18. The fuel processor of claim 17, wherein the second membrane includes an etched region having a reduced thickness compared to an unetched region of the second membrane.

19. The fuel processor of claim 17, wherein the membrane module contains a plurality of membrane envelopes, and further wherein the plurality of membrane envelopes includes the membrane envelope containing the first and the second membranes.

20. The fuel processor of claim 19, wherein the membrane module further includes fluid conduits that are adapted to deliver the mixed gas stream to the membrane envelopes and withdraw the product stream from the permeate channels.

21. The fuel processor of claim 17, wherein the support permits hydrogen gas that permeates through the membranes to flow therethrough in directions both parallel and transverse to the membranes.

22. The fuel processor of claim 17, wherein the support includes opposed surfaces upon which the permeate sides of the membranes extend, and further wherein the membranes are adhesively bonded to the surfaces during fabrication of the membrane module.

23. The fuel processor of claim 17, wherein the support is at least substantially coextensive with the permeate sides of the membranes.

24. The fuel processor of claim 17, wherein the support is at least partially formed from a porous medium.

25. The fuel processor of claim 17, wherein the support includes a screen structure having a membrane-contacting screen member.

26. The fuel processor of claim 25, wherein the membrane-contacting screen member is at least partially formed from an expanded metal material.

27. The fuel processor of claim 25, wherein the membrane-contacting screen member is at least partially formed from mesh.

28. The fuel processor of claim 25, wherein the screen structure includes a plurality of screen members.

29. The fuel processor of claim 28, wherein the plurality of screen members are adhesively bonded together during fabrication of the membrane module.

30. The fuel processor of claim 28, wherein the plurality of screen members includes at least a pair of screen members with surfaces that respectively extend against the permeate sides of the membranes and at least one central screen member that extends between the pair of screen members.

31. The fuel processor of claim 30, wherein the central screen member is coarser than the pair of screen members.

32. The fuel processor of claim 17, wherein the support includes a coating that is adapted to prevent intermetallic diffusion between the membranes and the support, and further wherein the coating is selected to be thermodynamically stable with respect to decomposition in the presence of hydrogen.

33. The fuel processor of claim 32, wherein the coating is formed from at least one of the group consisting of oxides, nitrides, carbides, and intermetallic compounds.

34. The fuel processor of claim 32, wherein the coating is selected from the group consisting of aluminum oxide, tungsten carbide, tungsten nitride, titanium carbide, titanium nitride, and mixtures thereof.

35. The fuel processor of claim 32, wherein the coating is applied to the support by at least one of chemical vapor deposition, sputtering, thermal evaporation, thermal spraying, and deposition followed by oxidation.

36. The fuel processor of claim 32, wherein the coating is adapted to be thermodynamically stable with respect to decomposition in the presence of hydrogen at temperatures less than approximately 400° C.

37. The fuel processor of claim 32, wherein the coating is adapted to be thermodynamically stable with respect to decomposition in the presence of hydrogen at temperatures less than approximately 700° C.

38. The fuel processor of claim 32, wherein the coating is adapted to be thermodynamically stable with respect to decomposition in the presence of hydrogen at pressures less than approximately 500 psi.

39. The fuel processor of claim 32, wherein the coating is adapted to be thermodynamically stable with respect to decomposition in the presence of hydrogen at pressures less than approximately 1000 psi.

40. The fuel processor of claim 1, wherein the fuel processor includes a shell and the membrane module is removably coupled to the shell.

41. The fuel processor of claim 40, wherein the membrane module is partially received within the shell.

42. The fuel processor of claim 41, wherein the membrane module forms a portion of the shell.

43. The fuel processor of claim 41, wherein the membrane module is housed within the shell.

44. The fuel processor of claim 1, wherein the fuel processor includes a combustion region and further wherein the fuel processor includes at least one gas transport conduit adapted to deliver at least a portion of the byproduct stream to the combustion region.

45. The fuel processor of claim 1, wherein the fuel processor includes a polishing region adapted to receive the portion of the mixed gas stream that passes through the membrane and to further reduce the concentration of the other gases therein.

46. The fuel processor of claim 45, wherein the polishing region includes at least one methanation catalyst bed.

47. The fuel processor of claim 45, wherein the polishing region includes at least one reforming catalyst bed located downstream from the membrane module.

48. The fuel processor of claim 1, in combination with a fuel cell stack adapted to receive at least a portion of the product stream and to produce an electric current therefrom.

49. The fuel processor of claim 48, in further combination with an electrical-energy consuming device.

* * * * *